US008526765B2

(12) United States Patent
Sakaguchi et al.

(10) Patent No.: US 8,526,765 B2
(45) Date of Patent: Sep. 3, 2013

(54) SUPER-RESOLUTION PROCESSOR AND SUPER-RESOLUTION PROCESSING METHOD

(75) Inventors: Satoshi Sakaguchi, Osaka (JP); Toru Matsunobu, Osaka (JP); Kenji Takita, Osaka (JP)

(73) Assignee: Panasonic Corporation, Osaka (JP)

( * ) Notice: Subject to any disclaimer, the term of this patent is extended or adjusted under 35 U.S.C. 154(b) by 283 days.

(21) Appl. No.: 13/021,870

(22) Filed: Feb. 7, 2011

(65) Prior Publication Data

US 2011/0206296 A1 Aug. 25, 2011

(30) Foreign Application Priority Data

Feb. 9, 2010 (JP) ................................. 2010-026170

(51) Int. Cl.
*G06K 9/32* (2006.01)
(52) U.S. Cl.
USPC ........... 382/299; 382/300; 382/298; 382/263; 382/264; 382/260; 382/261; 348/538
(58) Field of Classification Search
USPC ................. 382/260–261, 263–264, 298–300; 348/538
See application file for complete search history.

(56) References Cited

U.S. PATENT DOCUMENTS

| | | | | |
|---|---|---|---|---|
| 5,253,043 A * | 10/1993 | Gibson | | 348/708 |
| 5,661,525 A * | 8/1997 | Kovacevic et al. | | 348/452 |
| 6,128,357 A * | 10/2000 | Lu et al. | | 375/355 |
| 6,424,749 B1 * | 7/2002 | Zhu et al. | | 382/260 |
| 6,567,568 B1 * | 5/2003 | Nabeshima et al. | | 382/300 |
| 6,606,423 B2 * | 8/2003 | Cho | | 382/300 |
| 6,697,540 B1 * | 2/2004 | Chen | | 382/300 |
| 6,741,759 B2 * | 5/2004 | Lee et al. | | 382/300 |
| 7,391,476 B2 * | 6/2008 | Hahn | | 348/625 |
| 7,508,997 B2 * | 3/2009 | Wang et al. | | 382/300 |
| 2002/0140833 A1 * | 10/2002 | Hirai | | 348/280 |
| 2005/0018077 A1 * | 1/2005 | De Haan et al. | | 348/458 |
| 2005/0030424 A1 * | 2/2005 | De Haan et al. | | 348/458 |
| 2005/0220365 A1 * | 10/2005 | Hahn | | 382/300 |
| 2006/0257052 A1 * | 11/2006 | Chang et al. | | 382/300 |
| 2007/0041664 A1 * | 2/2007 | Yamada | | 382/299 |
| 2008/0137990 A1 * | 6/2008 | Ward | | 382/299 |

OTHER PUBLICATIONS

Freeman,W.T et al., Example based super-resolution, Computer Graphics and applications, IEEE, Mar.-Apr. 2002, pp. 56-65.*
Freeman, W.T. et al., "Example-based super-resolution", Computer Graphics and Applications, IEEE, Mar.-Apr. 2002, pp. 56-65.

* cited by examiner

*Primary Examiner* — Jayesh A Patel
(74) *Attorney, Agent, or Firm* — Wenderoth, Lind & Ponack, L.L.P.

(57) ABSTRACT

A super-resolution processor includes an N enlargement unit that generates an N-enlarged image by enlarging the input image by a factor N; an M enlargement unit that generates an M-enlarged image by enlarging the input image by a factor M; and a high-pass filter unit that extracts a high-frequency component of the M-enlarged image, as an M-enlarged high-frequency image. Additionally, a patch extraction unit extracts an estimated patch of a predetermined size from the M-enlarged high-frequency image, the estimated patch being a part of the M-enlarged high-frequency image; and an addition unit adds the estimated patch to a processing target block of the predetermined size in the N-enlarged image, to generate the output image, where M is smaller than N.

19 Claims, 20 Drawing Sheets

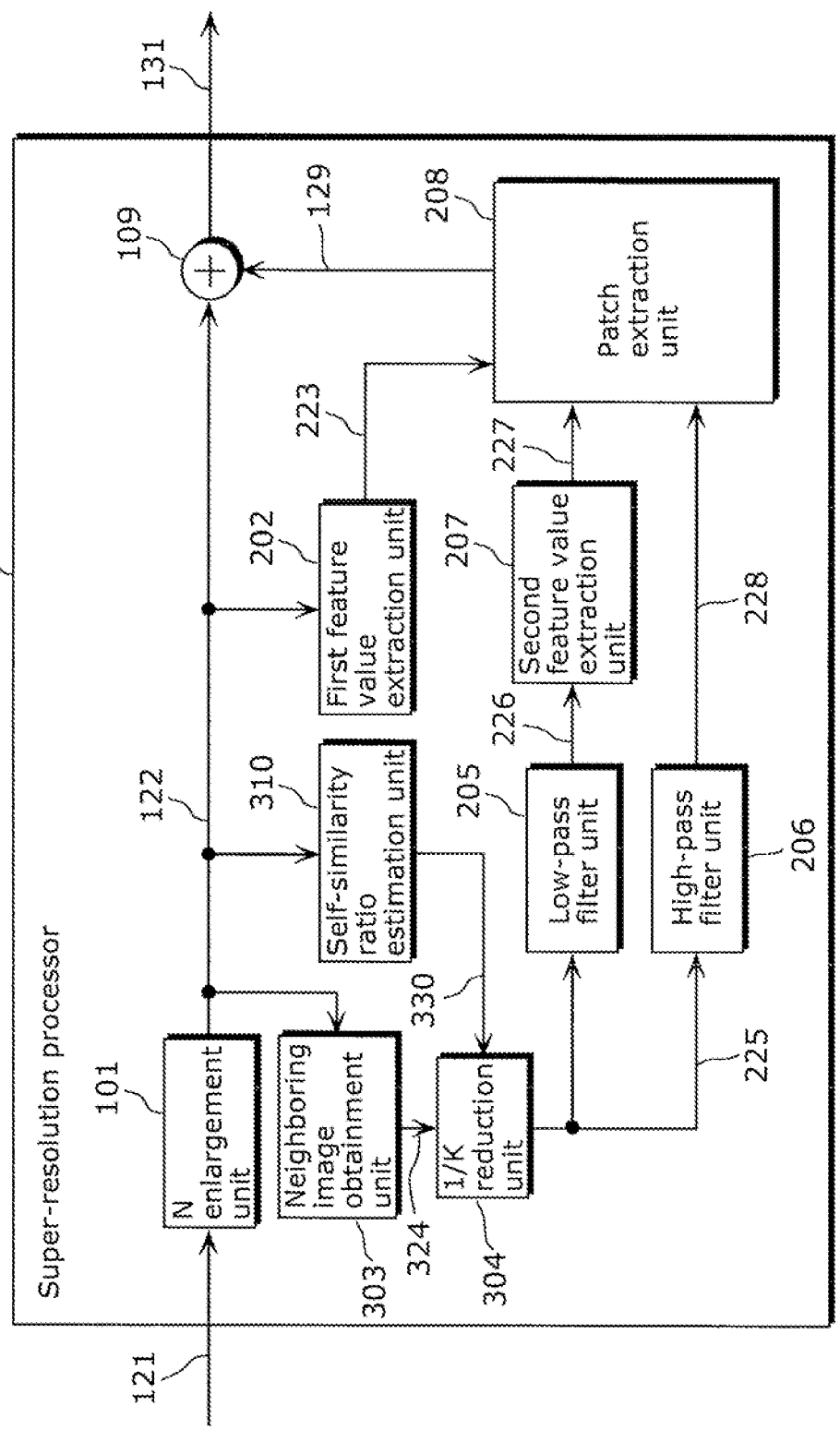

SUPER-RESOLUTION PROCESSOR AND SUPER-RESOLUTION PROCESSING METHOD

BACKGROUND OF THE INVENTION (1) Field of the Invention

The present invention relates to a super-resolution processor that performs super-resolution processing on an input image to generate an output image, and a super-resolution processing method.

(2) Description of the Related Art

Recent years have seen improvements in display resolution of display devices such as home television displays and PC (Personal Computer) displays. In detail, there has been emergence of display devices having display capability of full high-definition (1920×1080 pixels) or more. Accordingly, in the case of displaying standard-definition (such as 720×480 pixels) video content of an existing DVD (Digital Versatile Disc) and the like on such a display device in full screen, it is necessary to perform high-resolution processing for increasing a resolution of an image to a display resolution of the display device. A currently predominant technique for this is enlargement processing using a linear filter. Moreover, a method called super-resolution that enables generation of high-resolution information not present in an input image has been receiving attention in recent years.

As a conventional super-resolution processing method, there is training-based super-resolution disclosed in Non-patent Reference 1 (Freeman, W. T. Jones, T. R. Pasztor, E. C., "Example-based super-resolution", Computer Graphics and Applications, IEEE, March-April 2002). This method of Non-patent Reference 1 is described below.

(Structure and Operation 1 of a Super-Resolution Processor 900)

FIG. 21 is a block diagram of a super-resolution processor 900 in background art. The super-resolution processor 900 includes: an N enlargement unit 901 that generates an enlarged image 913 from an input image 911 of a low resolution; a high-pass filter unit 902 that generates a medium-frequency image 914 from the enlarged image 913; a patch extraction unit 903 that generates an estimated patch 917 from the medium-frequency image 914, a training medium-frequency patch 915, and a training high-frequency patch 916; an addition unit 904 that adds the estimated patch 917 to the enlarged image 913 to generate an output image 912; and a training database 905 that outputs the training medium-frequency patch 915 and the training high-frequency patch 916.

The N enlargement unit 901 enlarges the input image 911 N times in each of horizontal and vertical directions, where N is a factor for a desired resolution of super-resolution processing. The N enlargement unit 901 thus generates the enlarged image 913. For example, the N enlargement unit 901 enlarges the input image 911 using a pixel interpolation method such as bicubic interpolation or spline interpolation.

The high-pass filter unit 902 extracts a high-frequency component of the enlarged image 913 by linear filtering or the like, as the medium-frequency image 914.

The patch extraction unit 903 performs the following processing on the medium-frequency image 914, in units of fixed small blocks. The patch extraction unit 903 searches a large number of training medium-frequency patches 915 stored in the training database 905, for a training medium-frequency patch 915 most similar to a target image block in the medium-frequency image 914. A patch mentioned here is a block of data. The patch extraction unit 903 defines a distance between two patches by, for example, a sum of absolute differences or a sum of squared differences between pixels. The patch extraction unit 903 then determines similarity, according to how small the distance is. After the most similar training medium-frequency patch 915 is determined as a result of the search, the patch extraction unit 903 obtains a training high-frequency patch 916 paired with the determined training medium-frequency patch 915 in the training database 905, and outputs the obtained training high-frequency patch 916 as the estimated patch 917.

The addition unit 904 adds the estimated patch 917 to a patch at a target block position in the enlarged image 913 in units of pixels, and outputs an addition result as the output image 912.

The following describes a method of generating the training database 905 included in the super-resolution processor 900.

(Structure and Operation of a Training Database Generation Apparatus 950)

FIG. 22 is a block diagram of a training database generation apparatus 950 that generates the training database 905 in the background art. The training database generation apparatus 950 includes: a low-pass filter unit 951 that generates a training low-frequency image 962 from a training image 961 collected from an actual image captured by a digital camera beforehand and the like; a 1/N reduction unit 952 that generates a training low-resolution image 963 from the training low-frequency image 962; an N enlargement unit 953 that generates a training low-frequency image 964 from the training low-resolution image 963; a high-pass filter unit 954 that generates a training medium-frequency patch 915 from the training low-frequency image 964; a high-pass filter unit 955 that generates a training high-frequency patch 916 from the training image 961; and the training database 905 that stores the training medium-frequency patch 915 and the training high-frequency patch 916.

The low-pass filter unit 951 extracts a low-frequency component of the training image 961 by linear filtering or the like, as the training low-frequency image 962.

The 1/N reduction unit 952 reduces the training low-frequency image 962 by 1/N in each of the horizontal and vertical directions, to generate the training low-resolution image 963.

The N enlargement unit 953 enlarges the training low-resolution image 963 by the factor N in each of the horizontal and vertical directions, to generate the training low-frequency image 964.

The high-pass filter unit 954 extracts a high-frequency component of the training low-frequency image 964 by linear filtering or the like, and clips the extracted high-frequency component in units of fixed blocks mentioned earlier, thereby generating a plurality of training medium-frequency patches 915.

The high-pass filter unit 955 extracts a high-frequency component of the training image 961 by linear filtering or the like, and clips the extracted high-frequency component in units of fixed blocks mentioned earlier, thereby generating a plurality of training high-frequency patches 916.

The training database 905 associates a training medium-frequency patch 915 and a training high-frequency patch 916 generated from the same block position with each other, as one patch pair. The training database 905 stores data of both image patches and their correspondence relation.

(Operation 2 of the Super-Resolution Processor 900)

Thus, the training database 905 in the super-resolution processor 900 stores a large number of correspondence relations between actual medium-frequency images and high-frequency images, which are collected from actual images captured by a digital camera beforehand and the like. This allows the super-resolution processor 900 to search for a high-frequency image patch that is likely to be most related to a patch in the medium-frequency image 914. By adding the high-frequency image patch found as a result of the search to the enlarged image 913, a missing high-frequency component which is not present in the input image 911 can be added. Hence, the super-resolution processor 900 can generate a favorable output image 912.

SUMMARY OF THE INVENTION

In the above conventional structure, for a feature that intensely appears in the medium-frequency image which is a feature value derived from the input image, a detailed, favorable high-resolution image can be generated by addition of a corresponding high-frequency image patch. For a feature that does not sufficiently appear in the feature value, however, even when a corresponding high-frequency image patch is added, sufficiently improved detail may not be able to be attained in the generated high-resolution image.

For instance, for a portion having a clear edge in the input image, an edge feature is sufficiently represented in the feature value, so that a corresponding detailed edge can be attained. On the other hand, for a portion having a fine texture, since the texture is broken in the input image, a texture feature is not sufficiently reflected on the feature value. The use of a high-frequency image patch obtained as a result of search based on such a feature value merely results in the generation of a high-resolution image that does not have a fine texture component. Thus, the conventional structure has a problem that sufficient super-resolution effects cannot be achieved in a fine texture portion.

The present invention has been developed to solve the conventional problem stated above, and has an object of providing a super-resolution processor and a super-resolution processing method that can generate a more detailed high-resolution image in a fine texture portion in an image. Here, a texture indicates a portion, having fine detail of grain and the like, such as grass, rocks, sand, and leaves.

To solve the conventional problem stated above, a super-resolution processor according to one aspect of the present invention is a super-resolution processor that performs super-resolution processing on an input image to generate an output image of a higher resolution than the input image, the super-resolution processor including: an N enlargement unit that generates an N-enlarged image by enlarging the input image by a factor N, where N is larger than 1; an M enlargement unit that generates an M-enlarged image by enlarging the input image by a factor M, where M is larger than 1; a high-pass filter unit that extracts a high-frequency component of the M-enlarged image, as an M-enlarged high-frequency image; a patch extraction unit that extracts an estimated patch of a predetermined size from the M-enlarged high-frequency image, the estimated patch being a part of the M-enlarged high-frequency image; and an addition unit that adds the estimated patch to a processing target block of the predetermined size in the N-enlarged image, to generate the output image, wherein M is smaller than N.

In this structure, the super-resolution processor according to one aspect of the present invention can add, to the N-enlarged image, a finer, more detailed texture representation than the N-enlarged image, because the enlargement factor M in the M enlargement unit is smaller than the enlargement factor N. As a result, the super-resolution processor according to one aspect of the present invention can generate a more detailed high-resolution image in a fine texture portion in an image.

Moreover, the patch extraction unit may extract the estimated patch, from a neighboring region of a position of the processing target block in the M-enlarged high-frequency image.

In this structure, the super-resolution processor according to one aspect of the present invention can add a favorable, detailed texture to the target block in the N-enlarged image, because there is a high possibility that a texture similar to an object of the target block is present in an image in the neighboring region of the target block.

Moreover, the super-resolution processor may further include: a first feature value extraction unit that extracts an input feature value, the input feature, value being a feature value of the processing target block in the N-enlarged image; and a second feature value extraction unit that extracts a plurality of first neighboring feature values, each of the plurality of first neighboring feature values being a feature value of a different one of a plurality of patches in the M-enlarged image, the plurality of patches each having the predetermined size, wherein the patch extraction unit calculates similarity between the input feature value and each of the plurality of first neighboring feature values, and extracts, as the estimated patch, a region in the M-enlarged high-frequency image corresponding to any of: (1) one first neighboring feature value having highest similarity; (2) a predetermined number of first neighboring feature values in decreasing order of similarity; and (3) first neighboring feature values each having similarity equal to or higher than a predetermined threshold, from among the plurality of first neighboring feature values.

In this structure, the super-resolution processor according to one aspect of the present invention can add, to the target block in the N-enlarged image, a fine texture having a similar feature to the target block in the N-enlarged image, by selecting a patch having a feature value of high similarity. This enables the super-resolution processor to generate a favorable high-resolution image without errors.

Moreover, the super-resolution processor may further include a self-similarity ratio estimation unit that estimates a self-similarity ratio of the N-enlarged image, wherein the M enlargement unit generates the M-enlarged image by enlarging the input image by the factor M where M=N/K, when the self-similarity ratio is 1/K.

In this structure, the super-resolution processor according to one aspect of the present invention can add a favorable, detailed texture to the N-enlarged image, by estimating the self-similarity ratio of the texture.

Moreover, the self-similarity ratio estimation unit may calculate a period of variation of an autocorrelation function of the input image or the N-enlarged image, determine a larger value of K when the period of variation is shorter, and estimate the self-similarity ratio as 1/K.

In this structure, the super-resolution processor according to one aspect of the present invention can add a favorable, detailed texture to the N-enlarged image, by estimating the self-similarity ratio of the texture based on the autocorrelation function.

Moreover, the self-similarity ratio estimation unit may calculate energy of a high-frequency component of the input image or the N-enlarged image, determine a larger value of K when the energy is smaller, and estimate the self-similarity ratio as 1/K.

In this structure, the super-resolution processor according to one aspect of the present invention can add a favorable, detailed texture to the N-enlarged image, by estimating the self-similarity ratio of the texture based on the energy of the high-frequency component.

Moreover, the self-similarity ratio estimation unit may calculate a sum of absolute differences between adjacent pixels of the input image or the N-enlarged image, determine a larger value of K when the sum of absolute differences is smaller, and estimate the self-similarity ratio as 1/K.

In this structure, the super-resolution processor according to one aspect of the present invention can add a favorable, detailed texture to the N-enlarged image, by estimating the self-similarity ratio of the texture based on the sum of absolute differences between adjacent pixels.

Moreover, the M enlargement unit may further generate an M1-enlarged image by enlarging the input image by a factor M1, where M1 is larger than 1, wherein M1 is smaller than N, and different from M, the high-pass filter unit further extracts a high-frequency component of the M1-enlarged image, as an M1-enlarged high-frequency image, the second feature value extraction unit further extracts a plurality of second neighboring feature values, each of the plurality of second neighboring feature values being a feature value of a different one of a plurality of patches in the M1-enlarged image, the plurality of patches each having the predetermined size, the patch extraction unit further calculates similarity between the input feature value and each of the plurality of second neighboring feature values, and the patch extraction unit extracts the estimated patch from a region in the M-enlarged high-frequency image corresponding to any of: (1) one first neighboring feature value or second neighboring feature value having highest similarity; (2) a predetermined number of first neighboring feature values or second neighboring feature values in decreasing order of similarity; and (3) first neighboring feature values or second neighboring feature values each having similarity equal to or higher than a predetermined threshold, from among the plurality of first neighboring feature values and the plurality of second neighboring feature values.

In this structure, the super-resolution processor according to one aspect of the present invention can add a favorable, detailed texture to the N-enlarged image, by selecting a patch of high similarity from among a plurality of factors.

Moreover, the patch extraction unit may calculate, as the similarity, a sum of absolute differences or a sum of squared differences between the input feature value and each of the plurality of first neighboring feature values.

In this structure, the super-resolution processor according to one aspect of the present invention can select a fine texture having a similar feature, by selecting a patch with a small sum of absolute differences or a small sum of squared differences between feature values. This enables the super-resolution processor to generate a favorable high-resolution image without errors.

Moreover, the M enlargement unit may set M to a first value in the case where N is larger than a predetermined threshold, and set M to a second value in the case where N is equal to or smaller than the predetermined threshold, the second value being smaller than the first value.

In this structure, the super-resolution processor according to one aspect of the present invention can add a favorable, detailed texture to the N-enlarged image, by changing the factor M according to the factor N.

Moreover, a super-resolution processor according to one aspect of the present invention is a super-resolution processor that performs super-resolution processing on an input image to generate an output image, the super-resolution processor including: a 1/K reduction unit that generates a 1/K-reduced image by reducing the input image by 1/K; a high-pass filter unit that extracts a high-frequency component of the 1/K-reduced image, as a 1/K-reduced high-frequency image; a patch extraction unit that extracts an estimated patch of a predetermined size from the 1/K-reduced high-frequency image, the estimated patch being a part of the 1/K-reduced high-frequency image; and an addition unit that adds the estimated patch to a processing target block of the predetermined size in the 1/K-reduced image, to generate the output image.

In this structure, the super-resolution processor according to one aspect of the present invention can add, to the input image, a finer, more detailed texture representation than the input image, by reducing the input image by 1/K in the 1/K reduction unit. As a result, the super-resolution processor according to one aspect of the present invention can generate a more detailed high-resolution image in a fine texture portion in an image.

Moreover, the patch extraction unit may extract the estimated patch, from a neighboring region of a position of the processing target block in the 1/K-reduced high-frequency image.

In this structure, the super-resolution processor according to one aspect of the present invention can add a favorable, detailed texture to the input image, because there is a high possibility that a texture similar to an object of the target block is present in an image in the neighboring region of the target block.

Moreover, the super-resolution processor may further include: a first feature value extraction unit that extracts an input feature value, the input feature value being a feature value of the processing target block in the input image; and a second feature value extraction unit that extracts a plurality of first neighboring feature values, each of the plurality of first neighboring feature values being a feature value of a different one of a plurality of patches in the 1/K-reduced image, the plurality of patches each having the predetermined size, wherein the patch extraction unit calculates similarity between the input feature value and each of the plurality of first neighboring feature values, and extracts, as the estimated patch, a region in the 1/K-reduced high-frequency image corresponding to any of: one first neighboring feature value having highest similarity; a predetermined number of first neighboring feature values in decreasing order of similarity; and first neighboring feature values each having similarity equal to or higher than a predetermined threshold, from among the plurality of first neighboring feature values.

In this structure, the super-resolution processor according to one aspect of the present invention can add, to the target block in the input image, a detailed texture having a similar feature to the target block in the input image, by selecting a patch having a feature value of high similarity. This enables the super-resolution processor to generate a favorable high-resolution image without errors.

Moreover, the super-resolution processor may further include a self-similarity ratio estimation unit that estimates a self-similarity ratio of the input image, wherein the 1/K reduction unit generates the 1/K-reduced image by reducing the input image by 1/K, when the self-similarity ratio is 1/K.

In this structure, the super-resolution processor according to one aspect of the present invention can add a favorable, detailed texture to the input image, by estimating the self-similarity ratio of the texture.

Moreover, the super-resolution processor may further include: an edge super-resolution unit that generates an edge high-resolution image by increasing a resolution of the input image; an edge detection unit that detects an edge in the input image; and an image combining unit that combines the output image and the edge high-resolution image, wherein the image combining unit: combines the output image and the edge high-resolution image at a ratio in which the edge high-resolution image is higher than the output image, for a region having a larger amount of edge than a predetermined threshold in the input image; and combines the output image and the edge high-resolution image at a ratio in which the edge high-resolution image is lower than the output image, for a region having a smaller amount of edge than the predetermined threshold in the input image.

In this structure, the super-resolution processor according to one aspect of the present invention uses a super-resolution processing method suitable for edge reconstruction in a region having a large amount of edge, and uses the super-resolution processing method according to the present invention in a region having a small amount of edge, i.e., a region determined as a texture. As a result, the super-resolution processor according to one aspect of the present invention can generate a high-resolution image in which both edges and textures are improved in detail.

Note that the present invention can be realized not only as the super-resolution processor described above, but also as a super-resolution processing method including steps corresponding to the characteristic units in the super-resolution processor, or a program causing a computer to execute such characteristic steps. The program may be distributed via a non-transitory computer-readable recording medium such as a CD-ROM or a transmission medium such as the Internet.

Furthermore, the present invention can be realized as a semiconductor integrated circuit (LSI) that implements a part or all of the functions of the super-resolution processor.

Thus, the present invention provides a super-resolution processor and a super-resolution processing method that can generate a more detailed high-resolution image in a fine texture portion in an image.

FURTHER INFORMATION ABOUT TECHNICAL BACKGROUND TO THIS APPLICATION

The disclosure of Japanese Patent Application No. 2010-026170 filed on Feb. 9, 2010 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 is a block diagram of a super-resolution processor according to a third embodiment of the present invention;

DETAILED DESCRIPTION OF THE INVENTION

The following describes embodiments of the present invention with reference to drawings.

First Embodiment

Figure 1:
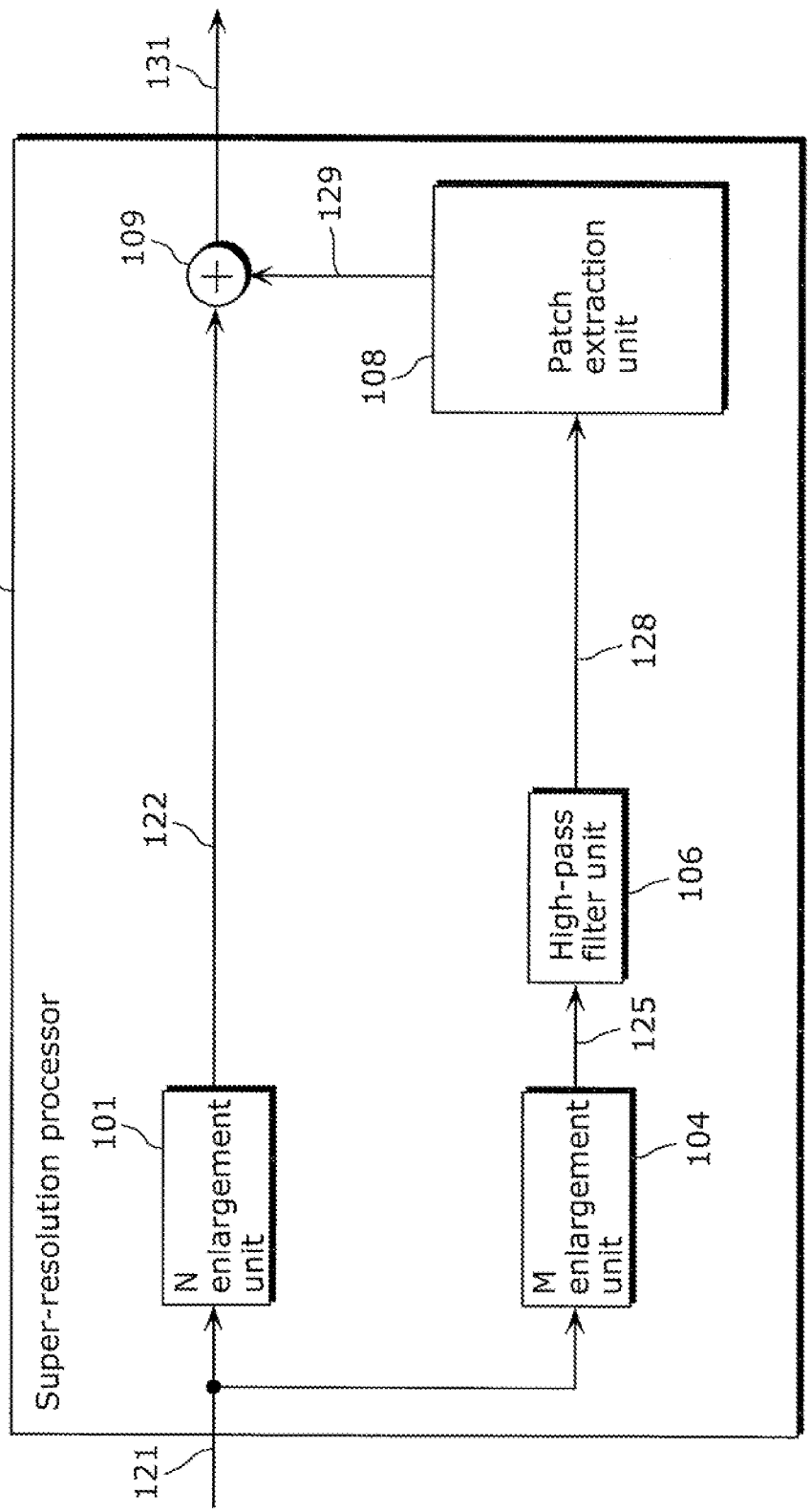
FIG. 1 is a block diagram of a super-resolution processor according to a first embodiment of the present invention.

FIG. 1 is a diagram showing a structure of a super-resolution processor 100 according to a first embodiment of the present invention.

The super-resolution processor 100 shown in FIG. 1 performs super-resolution processing on an input image 121 to generate an output image 131 of a higher resolution than the input image 121. The super-resolution processor 100 includes an N enlargement unit 101, an M enlargement unit 104, a high-pass filter unit 106, a patch extraction unit 108, and an addition unit 109.

The N enlargement unit 101 generates an N-enlarged image 122 by enlarging the input image 121 by a factor N (N is larger than 1).

The M enlargement unit 104 generates an M-enlarged image 125 by enlarging the input image 121 by a factor M (M is larger than 1). Here, M is smaller than N.

The high-pass filter unit 106 extracts a high-frequency component of the M-enlarged image 125, as an M-enlarged high-frequency image 128.

The patch extraction unit 108 extracts an estimated patch 129 of a predetermined size from the M-enlarged high-frequency image 128, the estimated patch 129 being a part of the M-enlarged high-frequency image 128. For example, the patch extraction unit 108 searches a region in the M-enlarged image 125 having high similarity to a processing target block (hereafter referred to as "target block) in the N-enlarged image 122, and extracts data of a region in the M-enlarged high-frequency image 128 corresponding to a search result, as the estimated patch 129. Here, the target block and the estimated patch 129 are equal in size.

The addition unit 109 adds the estimated patch 129 to the target block in the N-enlarged image 122, to generate the output image 131.

As described above, when performing super-resolution processing on the processing target block (hereafter "target block") in the input image 121, the super-resolution processor 100 according to the first embodiment of the present invention searches the M-enlarged image 125 generated by enlarging the input image 121 by the factor M (M<N), for the estimated patch 129, and adds the estimated patch 129 to the N-enlarged image 122.

In this way, the super-resolution processor 100 according to the first embodiment of the present invention can add a finer, more detailed texture representation than the N-enlarged image 122, to the N-enlarged image 122. As a result, the super-resolution processor 100 can generate a more detailed high-resolution image in a fine texture portion in an image.

Second Embodiment

A second embodiment of the present invention relates to a variation of the super-resolution processor 100 according to the first embodiment. Note that each of the following embodiments mainly describes differences from its preceding embodiments, while omitting description of the same components as those in the preceding embodiments. In addition, the same components are given the same reference numerals in the embodiments.

Figure 2:
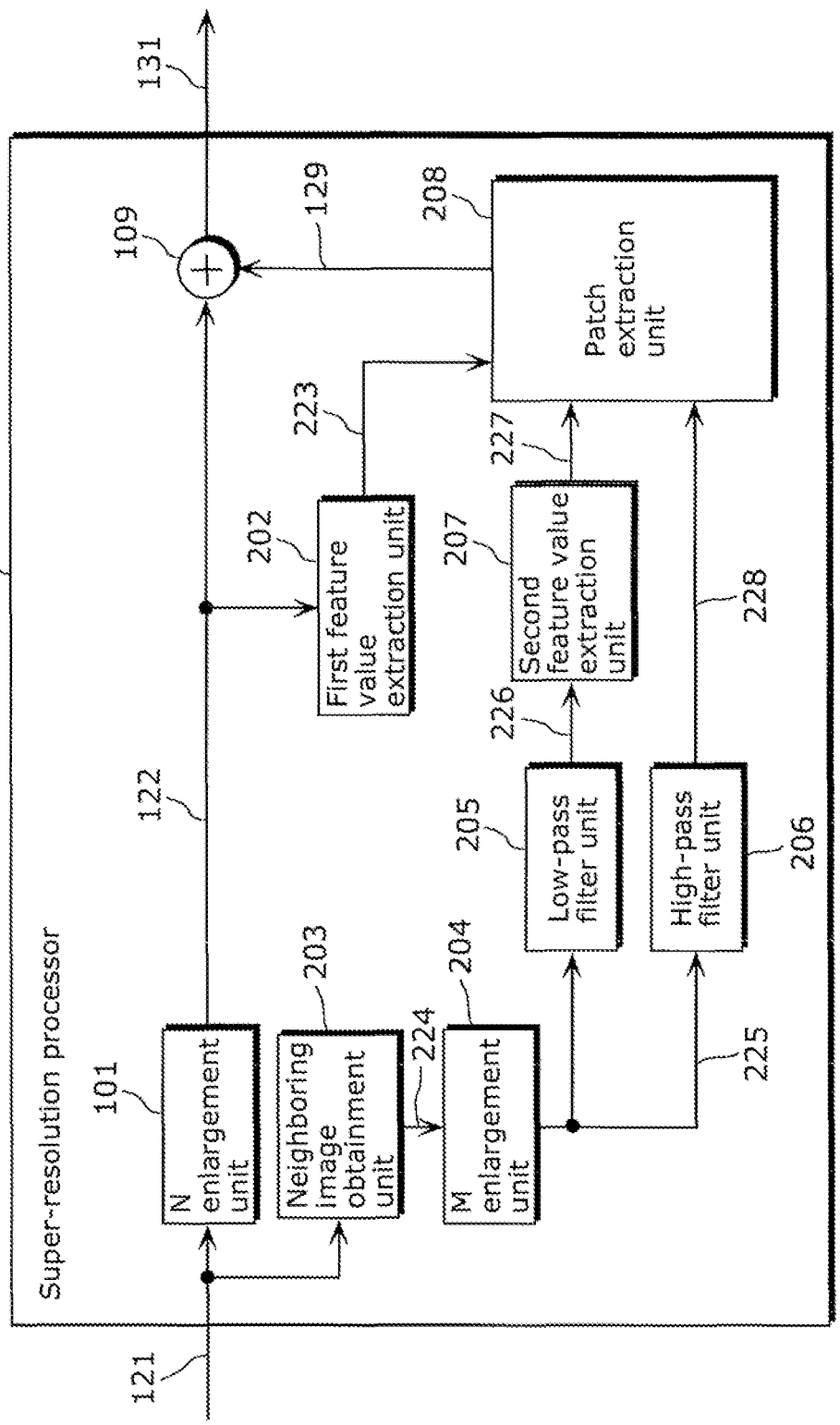
FIG. 2 is a block diagram of a super-resolution processor according to a second embodiment of the present invention.

The following describes a super-resolution processor 200 according to the second embodiment of the present invention, with reference to FIG. 2.

The super-resolution processor 200 shown in FIG. 2 generates the high-resolution output image 131 by improving the resolution of the low-resolution input image 121 by the factor N. When performing super-resolution processing on the target block in the input image 121, the super-resolution processor 200 searches a neighboring M-enlarged image 225 generated by enlarging a neighboring region of the target block by the factor M (M<N), for the estimated patch 129. The super-resolution processor 200 then adds the estimated patch 129 to the N-enlarged image 122, to generate the high-resolution output image 131.

(Structure and Operation of the Super-Resolution Processor 200)

The super-resolution processor 200 includes: the N enlargement unit 101 that generates the N-enlarged image 122 from the input image 121; a first feature value extraction unit 202 that extracts an input feature value 223 from the N-enlarged image 122; a neighboring image obtainment unit 203 that obtains a neighboring image 224 from the input image 121; an M enlargement unit 204 that generates the neighboring M-enlarged image 225 from the neighboring image 224; a low-pass filter unit 205 that generates a neighboring low-frequency image 226 from the neighboring M-enlarged image 225; a second feature value extraction unit 207 that extracts a neighboring feature value 227 from the neighboring low-frequency image 226; a high-pass filter unit 206 that generates a neighboring high-frequency image 228 from the neighboring M-enlarged image 225; a patch extraction unit 208 that outputs the estimated patch 129 according to the input feature value 223, the neighboring feature value 227, and the neighboring high-frequency image 228; and the addition unit 109 that generates the high-resolution output image 131 using the N-enlarged image 122 and the estimated patch 129.

The N enlargement unit 101 performs simple N-times enlargement on the input image 121 in each of horizontal and vertical directions, where N is a factor (enlargement factor) for a desired resolution of super-resolution processing. The N enlargement unit 101 thus generates the N-enlarged image 122. Here, the N enlargement unit 101 enlarges the input image 121 using a pixel interpolation method such as bicubic interpolation or spline interpolation. The N-enlarged image 122 does not contain a significant high-frequency component exceeding 1/N of the Nyquist frequency, and is a blurry image that lacks detail.

The first feature value extraction unit 202 extracts the input feature value 223 which is a feature value of the target block in the N-enlarged image 122. Specifically, the first feature value extraction unit 202 performs weighting on the N-times enlarged image 122 for each frequency band by linear filtering or the like, to generate a feature value suitable for search in the patch extraction unit 208. The first feature value extraction unit 202 outputs the generated feature value as the input feature value 223. For example, the weighting for each frequency band is a process of assigning a larger weight to low frequencies and a smaller weight to high frequencies by using a linear low-pass filter that allows low frequencies to pass through. Alternatively, the first feature value extraction unit 202 may output the N-enlarged image 122 directly as the input feature value 223, without performing weighting.

The neighboring image obtainment unit 203 extracts, from the input image 121, an image of a region of a fixed range in a neighborhood of a position of the target block in the input image 121. The neighboring image obtainment unit 203 outputs the extracted image as the neighboring image 224. Note that the region of the fixed range in the neighborhood of the target block position may be a region including the target block position, or a region not including the target block position.

The M enlargement unit 204 performs simple M-times enlargement on the neighboring image 224 in each of the horizontal and vertical directions, to generate the neighboring M-enlarged image 225. Here, the M enlargement unit 204 enlarges the neighboring image 224 using a pixel interpolation method such as bicubic interpolation or spline interpolation. M is a real number satisfying M<N. Note that such a super-resolution method that reconstructs a missing high-frequency component may be applied as the pixel interpolation method used by the M enlargement unit 204. As an example, the super-resolution method described as the conventional technique may be applied. This enables a detailed texture image containing more high-frequency components to be attained in the eventual output image 131.

The low-pass filter unit 205 extracts a low-frequency component of the neighboring M-enlarged image 225 by linear filtering or the like, as the neighboring low-frequency image 226. The low-pass filter unit 205 has the same function as the low-pass filter unit 951 in the conventional technique. In the conventional technique, it is necessary to search the training database storing a large number of examples that degrade with the same degradation characteristics as when the input image 121 is generated, for a training image patch having most accurate similarity. On the other hand, in the super-resolution processor 200 according to the second embodiment of the present invention, an image patch not significantly deviating in texture feature can be selected from a small number of neighboring image patches. Therefore, in the super-resolution processor 200, there is no need to accurately simulate degradation characteristics with which the input image 121 is generated from a true high-resolution image, unlike the conventional technique. In other words, fixed filter characteristics can be uniquely set regardless of the degradation characteristics of the input image 121. Note that processing units equivalent to the 1/N reduction unit 952 and the N enlargement unit 953 may be provided in a stage following the low-pass filter unit 205, as in the conventional technique.

The second feature value extraction unit 207 extracts a plurality of first neighboring feature values 227 which are each a feature value of a different one of a plurality of patches of a predetermined size in the neighboring M-enlarged image 225. Specifically, the second feature value extraction unit 207 extracts a feature value from the neighboring low-frequency image 226, by the same processing as the first feature value extraction unit 202. The second feature value extraction unit 207 then clips the extracted feature value in units of fixed blocks, to generate the plurality of neighboring feature values 227. Alternatively, the second feature value extraction unit 207 may clip the neighboring low-frequency image 226 directly in units of fixed blocks to generate the plurality of neighboring feature values, without performing weighting. Moreover, the processing of the second feature value extraction unit 207 and the processing of the low-pass filter unit 205 may be integrated in such a manner that the processing of the two processing units is realized by single linear filtering.

The high-pass filter unit 206 extracts a high-frequency component of the neighboring M-enlarged image 225 at a block position determined by the patch extraction unit 208, by linear filtering or the like. The high-pass filter unit 206 outputs the extracted high-frequency component as the neighboring high-frequency image 228.

The patch extraction unit 208 performs the following processing on the input feature value 223 in units of blocks. The patch extraction unit 208 searches the plurality of neighboring feature values 227 for a neighboring feature value 227 most similar to the input feature value 223. Here, the patch extraction unit 208 defines a distance between two feature values by, for example, a sum of absolute differences or a sum of squared differences between adjacent pixels. The patch extraction unit 208 determines that the similarity is higher when the distance is smaller. After the most similar neighboring feature value 227 is determined as a result of the search, the patch extraction unit 208 clips an image of a block at a position corresponding to the block position of the determined neighboring feature value 227, from the neighboring high-frequency image 228. The patch extraction unit 208 outputs the clipped image as the estimated patch 129.

Note that, instead of determining one most similar neighboring feature value 227, the patch extraction unit 208 may determine neighboring feature values 227 similar to the input feature value 223 (for example, the above-mentioned distance is equal to or smaller than a predetermined threshold), and output, as the estimated patch 129, a result of averaging these neighboring feature values 227 or a result of weighted averaging these neighboring feature values 227 according to similarity. In the case of weighted average, a larger weight is assigned to a patch having a smaller distance. As an alternative, the patch extraction unit 208 may determine neighboring feature values 227 of top B candidates (B is an integer equal to or larger than 1) that are most similar (i.e. the distance is smallest), and output, as the estimated patch 129, a result of averaging these neighboring feature values 227 or a result of weighted averaging these neighboring feature values 227 according to similarity. A method of combining the plurality of patches may be an arbitrary method other than average or weighted average.

The addition unit 109 adds the estimated patch 129 to the patch at the target block position in the N-enlarged image 122 in units of pixels, and outputs an addition result as the output image 131.

Note that, in each of the N enlargement unit 101 and the M enlargement unit 204, a factor may be separately set in each of the horizontal and vertical directions. Suppose the N enlargement unit 101 uses NH and NV respectively as factors in the horizontal and vertical directions, and the M enlargement unit 204 uses MH and MV respectively as factors in the horizontal and vertical directions. In such a case, MH and MV are set so that MH<NH and MV<NV.

Moreover, in the super-resolution processor 200, instead of using the low-pass filter unit 205 and the second feature value extraction unit 207, the patch extraction unit 208 may output, as the estimated patch 129, one patch or a combination of a plurality of patches clipped from the neighboring high-frequency image 228 by any other arbitrary method.

(Operation Example of the Super-Resolution Processor 200)

Figure 3:
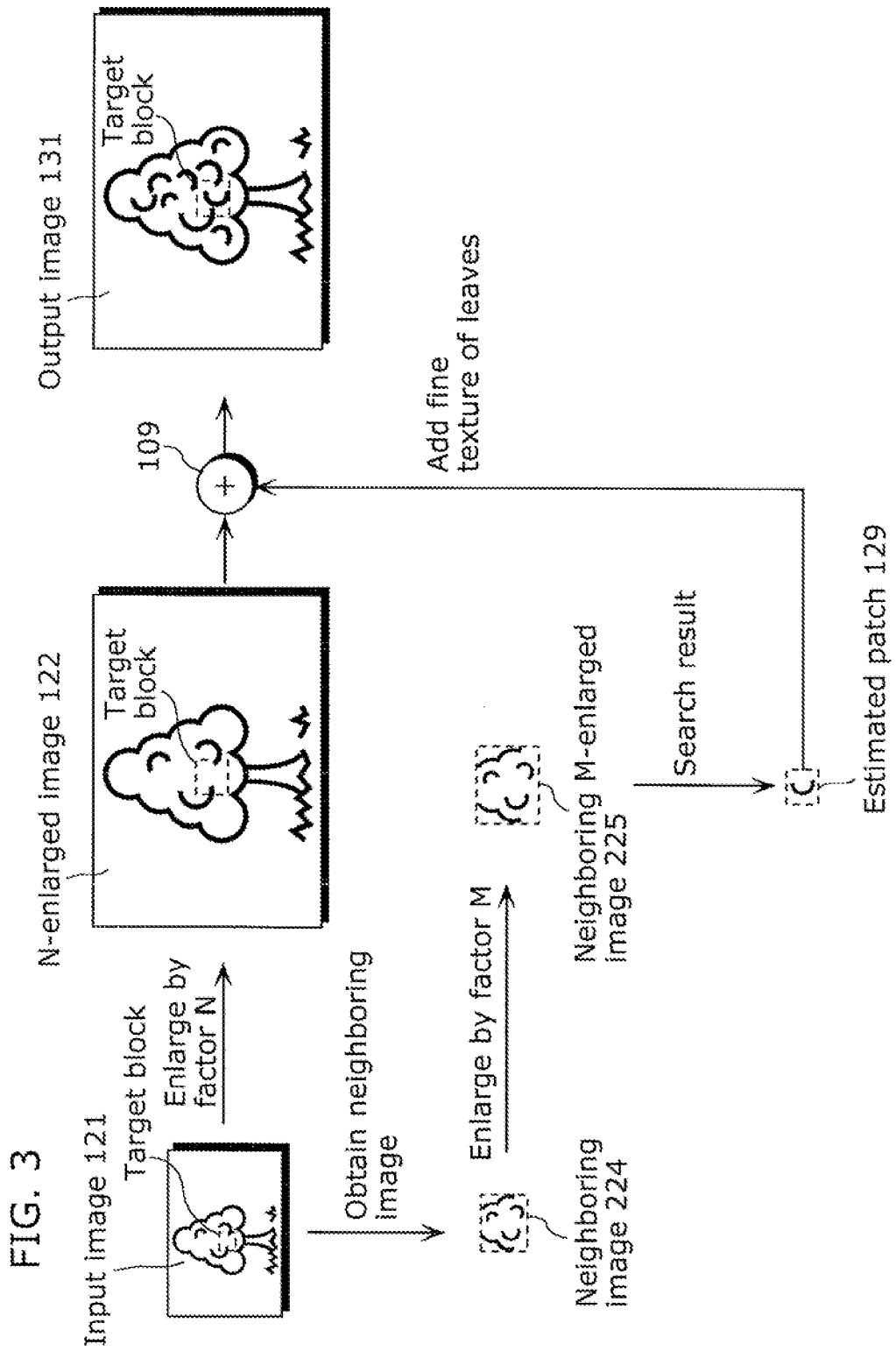
FIG. 3 is a diagram showing an operation example of the super-resolution processor according to the second embodiment of the present invention.

FIG. 3 shows a specific operation example of the super-resolution processor 200. FIG. 3 shows an example where the input image 121 is an image containing a texture of leaves. Throughout the entire operation, the super-resolution processor 200 processes the input image 121 in units of blocks of a predetermined size. Note that the unit of processing is not limited to a fixed-size block, and may be a variable block according to a local feature of the image. Besides, the unit of processing is not limited to a rectangular block, and may have an arbitrary shape such as a circle or a polygon.

The N-enlarged image 122 generated by enlarging the input image 121 by the factor N is an image that lacks detail, where the texture of leaves has only coarse grain enlarged by the factor N. This is because, even though a fine-grained texture is originally contained, the texture is broken and so is not represented in the input image 121 due to low resolution. In the N-enlarged image 122 shown in FIG. 3, a region of a target block indicated by a dotted box has little texture component, but it can be estimated that a fine texture component is originally present in this region.

In order to add a fine texture to the target block, the super-resolution processor 200 performs the following processing.

First, the M enlargement unit 204 generates the neighboring M-enlarged image 225, by enlarging the neighboring image 224 obtained by the neighboring image obtainment unit 203 by the factor M. Here, M is a value satisfying M<N. That is, the grain of texture contained in the neighboring M-enlarged image 225 is smaller than the grain of texture contained in the N-enlarged image 122.

Next, the patch extraction unit 208 searches the neighboring M-enlarged image 225 for an appropriate texture region, and generates the estimated patch 129. Note that a patch shape is not limited to a rectangular block, and may be an arbitrary shape such as a circle or a polygon. The estimated patch 129 contains a fine texture component not included in the target block in the N-enlarged image 122.

Following this, the addition unit 109 adds the estimated patch 129 to the N-enlarged image 122, to generate the output image 133 with improved detail.

Typically, a texture in an image has a tendency of having self-similarity like a fractal image. Accordingly, in the case where a fine-grained texture in similarity relation with the texture in the image is added to the image as in the operation of the second embodiment, even if the added texture is different from a texture contained in a true high-resolution image, a natural, detailed image with no visual awkwardness can be generated.

(Super-Resolution Processing Method)

Figure 4:
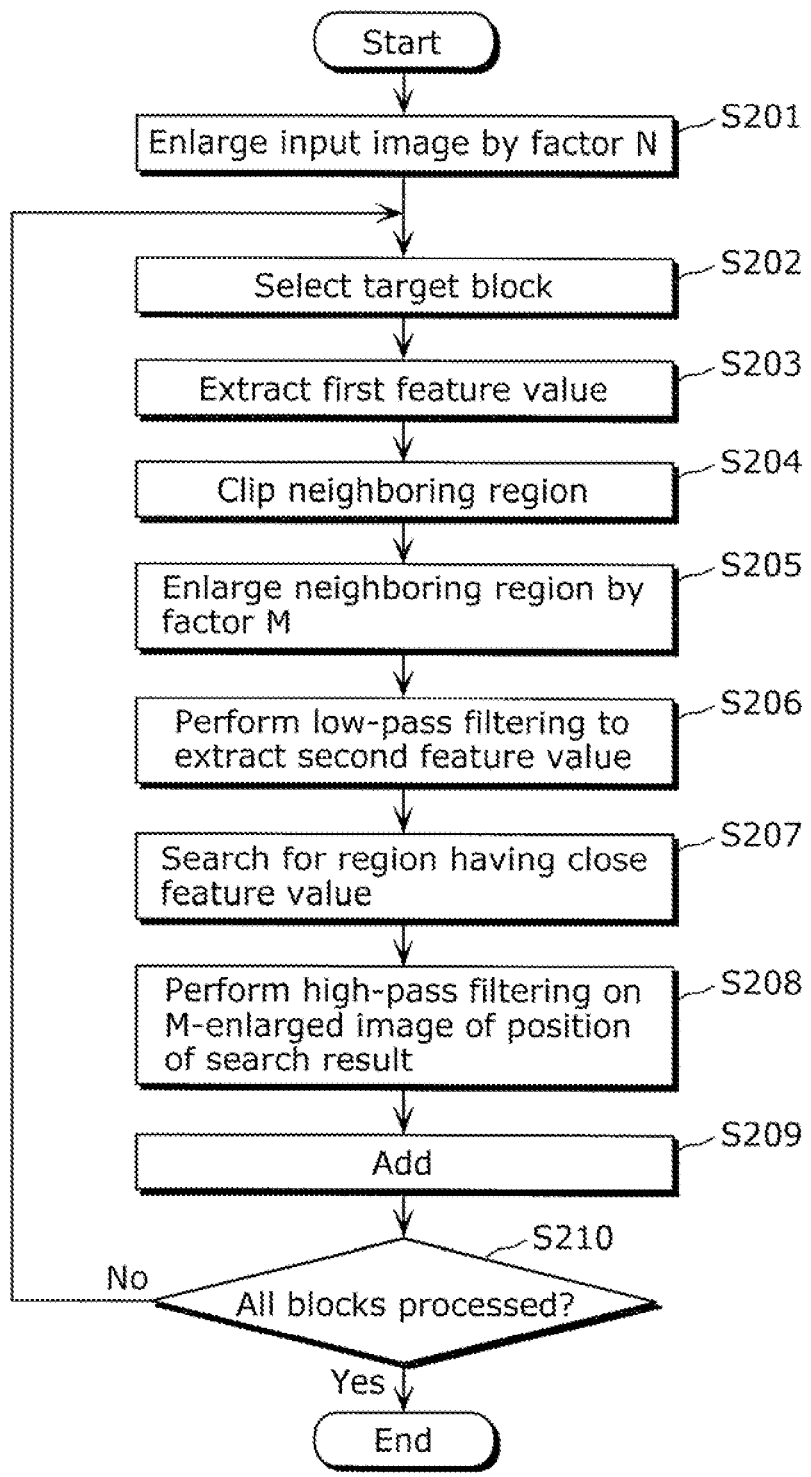
FIG. 4 is a flowchart of a super-resolution processing method according to the second embodiment of the present invention.

FIG. 4 is a flowchart of a super-resolution processing method in the super-resolution processor 200.

First, the N enlargement unit 101 enlarges the input image 121 by the factor N using a pixel interpolation method such as bicubic interpolation or spline interpolation, to generate the N-enlarged image 122 (Step S201).

Next, the super-resolution processor 200 selects a processing target block in the input image 121 or the N-enlarged image 122 (Step S202).

Following this, the first feature value extraction unit 202 extracts the input feature value 223 of the target block by, for example, performing weighting on an image of the target block in the N-enlarged image 122 for each frequency band by linear filtering or the like (Step S203). As an alternative, the first feature value extraction unit 202 may extract the N-enlarged image 122 directly as the input feature value 223, without performing weighting. That is, the input feature value 223 may be pixel values of the image of the target block in the N-enlarged image 122, or information obtained by performing predetermined processing (e.g., filtering) on the pixel values.

Meanwhile, the neighboring image obtainment unit 203 clips an image of a neighboring region of the target block in the input image 121, to generate the neighboring image 224 (Step S204).

Figure 5:
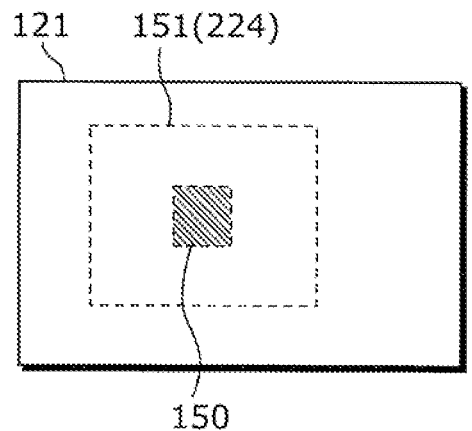
FIG. 5 is a diagram showing an example of a target block and a neighboring region according to the second embodiment of the present invention.

FIG. 5 is a diagram showing an example of a neighboring region 151. As shown in FIG. 5, the neighboring image obtainment unit 203 obtains the neighboring region 151 around a target block 150, as the neighboring image 224. For instance, the neighboring region 151 is a rectangular region that includes the target block 150 and a predetermined number of pixels from the target block 150 in up, down, left, and right directions. Alternatively, the neighboring region 151 may not be centered on the target block 150. Moreover, the neighboring region 151 may be a square rectangle or a non-square rectangle. Besides, the neighboring region 151 is not limited to a fixed size, and may have a variable size according to a local feature of the image. Furthermore, the neighboring region 151 is not limited to a rectangular block, and may have an arbitrary shape such as a circle or a polygon.

Next, the M enlargement unit 204 enlarges the clipped neighboring image 224 by the factor M using a pixel interpolation method such as bicubic interpolation or spline interpolation, to generate the neighboring M-enlarged image 225 (Step S205).

After this, the low-pass filter unit 205 performs weighting (low-pass filtering) on the neighboring M-enlarged image 225 for each frequency band by linear filtering or the like, to generate the neighboring low-frequency image 226. The second feature value extraction unit 207 extracts a feature value of the neighboring low-frequency image 226. The second feature value extraction unit 207 then extracts the extracted feature value for each block, to generate the plurality of neighboring feature values 227 (Step S206). Here, the second feature value extraction unit 207 may extract the plurality of neighboring feature values 227 directly from the neighboring M-enlarged image 225, without performing weighting. That is, each neighboring feature value 227 may be pixel values of a patch in the neighboring M-enlarged image 225, or information obtained by performing predetermined processing (e.g., filtering) on the pixel values.

Figure 6:
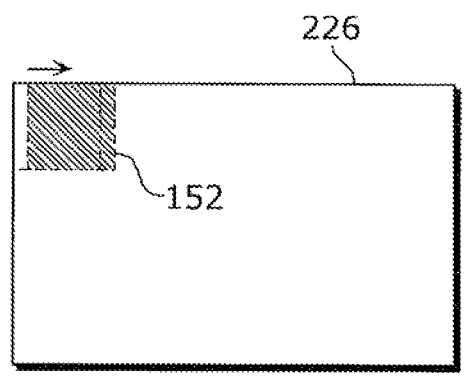
FIG. 6 is a diagram showing an example of patch extraction processing according to the second embodiment of the present invention.

FIG. 6 is a diagram showing an example of processing by the second feature value extraction unit 207. As shown in FIG. 6, the second feature value extraction unit 207 generates the plurality of neighboring feature values 227 extracted from the neighboring low-frequency image 226 for each block 152. Here, it is preferable that two adjacent neighboring feature values 227 have regions overlapping with each other, as shown in FIG. 6.

Next, the patch extraction unit 208 searches the plurality of neighboring feature values 227 for a neighboring feature value 227 close to the input feature value 223 (Step S207). The high-pass filter unit 206 generates the neighboring high-frequency image 228, by high-pass filtering the neighboring M-enlarged image 225 at the same position as the neighboring feature value 227 found as a result of the search. The patch extraction unit 208 outputs this neighboring high-frequency image 228 as the estimated patch 129 (Step S208).

After this, the addition unit 109 adds the generated estimated patch 129 to the target block position in the N-enlarged image 122 (Step S209).

In the case where super-resolution processing has not been completed for all blocks (Step S210: No), the super-resolution processer 200 selects the next block as the target block (Step S202), and performs the processing from Step S203 onward on the selected target block.

Figure 7:
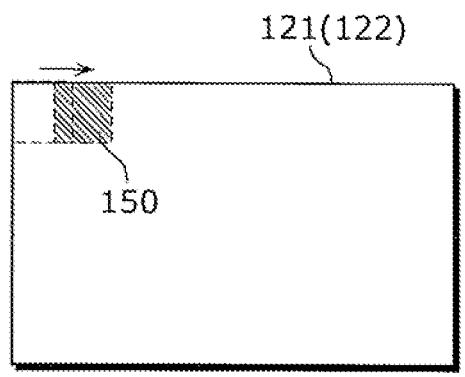
FIG. 7 is a diagram showing an example of target block selection processing according to the second embodiment of the present invention.

FIG. 7 is a diagram showing an example of processing by the super-resolution processor 200. As shown in FIG. 7, the super-resolution processor 200 selects the target block sequentially. Here, two adjacent blocks have regions overlapping with each other, as shown in FIG. 7. However, the two adjacent blocks may not have overlapping regions.

Note that the procedure shown in FIG. 4 is merely one example, and any other procedure may be employed so long as the same advantageous effects can be achieved.

Figure 8:
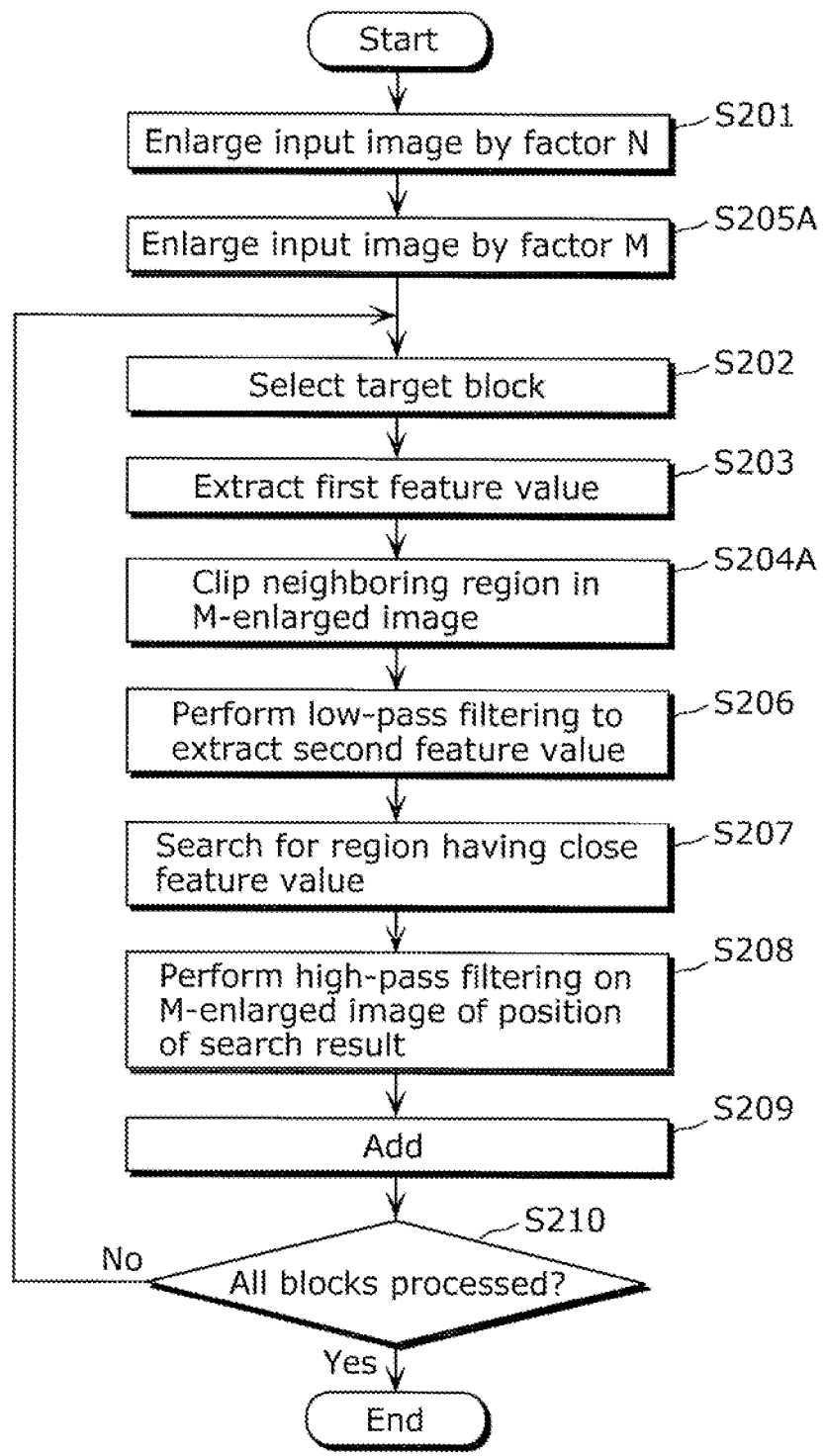
FIG. 8 is a flowchart of a variation of the super-resolution processing method according to the second embodiment of the present invention.

FIG. 8 is a flowchart of a variation of the super-resolution processing method according to the second embodiment of the present invention. For example, as shown in FIG. 8, instead of generating the neighboring M-enlarged image 225 for each target block, the super-resolution processor 200 may generate an M-enlarged image by enlarging the input image 121 by the factor M beforehand (Step S205A), and then generate, for each block, the neighboring M-enlarged image 255 by clipping the neighboring region from the M-enlarged image generated beforehand (Step S204A).

Processing order shown in each of FIGS. 4 and 8 is merely one example, and the order may be changed or part of the processing may be performed in parallel, so long as the same processing result can be obtained.

For instance, the series of processing of Steps S201 and S203 and the series of processing of Steps S204 to S206 in FIG. 4 may be reversed in order, or part of the processing may be performed in parallel.

(Advantageous Effects of the Second Embodiment)

Typically, a texture in an image has a tendency of having self-similarity like a fractal image. Accordingly, by extracting, from an input image, a finer-grained texture in similarity relation with the texture in the image and adding the extracted texture to the image, a natural, detailed image with no visual awkwardness can be generated.

Third Embodiment

A third embodiment of the present invention relates to a variation of the super-resolution processor 200 according to the second embodiment described above.

The following describes a super-resolution processor 300 according to the third embodiment of the present invention, with reference to FIG. 9.

When performing super-resolution processing on the target block in the input image 121, the super-resolution processor 300 shown in FIG. 9 estimates a self-similarity ratio according to the input image 121. The super-resolution processor 300 then generates the neighboring M-enlarged image 225 by enlarging the neighboring region of the target block by the factor M (M=N/K), based on the estimated self-similarity ratio 1/K. The super-resolution processor 300 searches the generated neighboring M-enlarged image 225 for the estimated patch 129, and adds the obtained estimated patch 129 to the N-enlarged image 122, to generate the high-resolution output image 131.

(Structure and Operation of the Super-Resolution Processor 300)

The super-resolution processor 300 includes a self-similarity ratio estimation unit 310 that generates self-similarity ratio information 330 from the N-enlarged image 122, in addition to the structure of the super-resolution processor 200 described above. Moreover, instead of the neighboring image obtainment unit 203 and the M enlargement unit 204, the super-resolution processor 300 includes: a neighboring image obtainment unit 303 that obtains a neighboring N-enlarged image 324 from the N-enlarged image 122; and a 1/K reduction unit 304 that generates the neighboring M-enlarged image 225 according to the neighboring N-enlarged image 324 and the self-similarity ratio information 330.

Note that the N enlargement unit 101, the first feature value extraction unit 202, the low-pass filter unit 205, the high-pass filter unit 206, the second feature value extraction unit 207, the patch extraction unit 208, and the addition unit 109 are the same as those described in the second embodiment, and so their description is omitted.

The self-similarity ratio estimation unit 310 estimates a self-similarity ratio in the N-enlarged image 122, and outputs the estimated self-similarity ratio as the self-similarity ratio information 330. Note that there is a tendency that a perceptually favorable output image 131 can be obtained by operating the super-resolution processor 300 with a high self-similarity ratio in the case of a fine texture image and a low self-similarity ratio in the case of a coarse texture image.

There is also a tendency that an autocorrelation function varies with a short period in the case of a fine-grained texture, and varies with a long period in the case of a coarse-grained texture. The self-similarity ratio estimation unit 310 calculates an autocorrelation function ACF(x) of the N-enlarged image 122. The self-similarity ratio estimation unit 310 sets, as X, a smallest x corresponding to a maximum of ACF where x>0, and estimates the self-similarity ratio using a function that monotonically decreases with the value of X. The self-similarity ratio estimation unit 310 outputs the estimated self-similarity ratio as the self-similarity ratio information 330.

The autocorrelation function mentioned here is a function that indicates a pixel value for a pixel position. For example, an autocorrelation function for a two-dimensional image of the N-enlarged image 122 may be an autocorrelation function calculated with respect to a one-dimensional axis set in the two-dimensional image. Moreover, the self-similarity ratio estimation unit 310 may calculate an autocorrelation function separately for each of a plurality of one-dimensional axes such as 0 degree, 45 degrees, 90 degrees, and so on where 0 degree corresponds to a horizontal direction, and combine calculated functions by interval averaging or the like. Alternatively, the self-similarity ratio estimation unit 310 may calculate a self-similarity ratio directly using a two-dimensional autocorrelation function ACF(x, y). In the case of using the two-dimensional autocorrelation function, the self-similarity ratio estimation unit 310 may convert the two-dimensional autocorrelation function to a one-dimensional function where $z$ ($z>0$) defined by $z^2=x^2+y^2$ is set on a horizontal axis and an ACF value is set on a vertical axis, and perform analysis using this one-dimensional function.

Figure 10B:
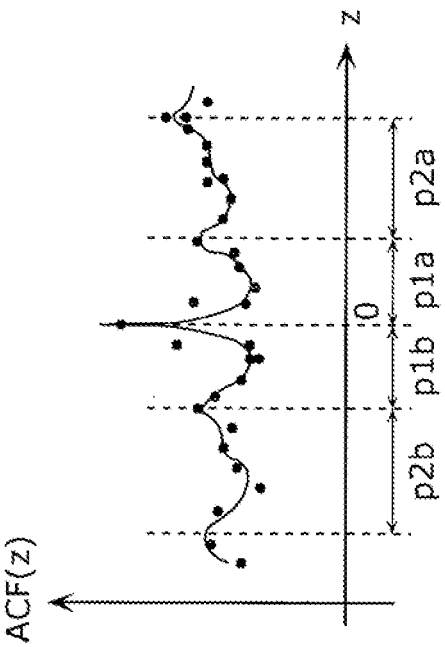
FIG. 10B is a diagram showing an example of processing of a self-similarity ratio estimation unit according to the third embodiment of the present invention.
Figure 10A:
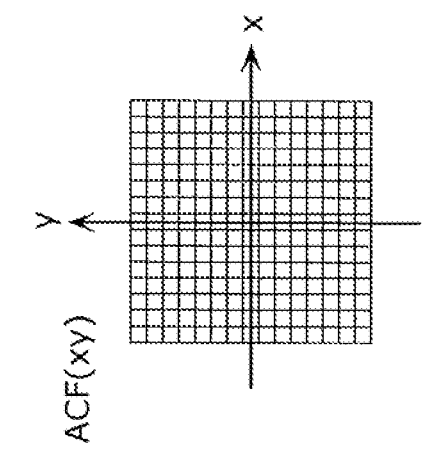
FIG. 10A is a diagram showing an autocorrelation function of an N-enlarged image according to the third embodiment of the present invention.

An example of using the two-dimensional autocorrelation function is described below, with reference to FIGS. 10A and 10B. FIG. 10A is a diagram showing the autocorrelation function ACF(x) of the N-enlarged image 122. Each of a plurality of rectangles shown in FIG. 10A represents one sample of ACF. Note that sample values are omitted in FIG. 10A. FIG. 10B is a diagram in which samples of the autocorrelation function shown in FIG. 10A are plotted as points, where $z$ ($z>0$) defined by $z^2=x^2+y^2$ is set on a horizontal axis and autocorrelation ACF(z) is set on a vertical axis. A curve (solid line) shown in FIG. 10B is an outcome of calculating an average for each short interval of the z axis based on the plotted points and connecting the calculated averages by a line. Distances between maxima of this curve are p1a, p2a, p1b, and p2b.

The self-similarity ratio estimation unit 310 performs an operation such as $p=(p1a+p1b)/2$ or $p=(p1a+p2a+p1b+p2b)/4$ based on these distances, to calculate an estimated period p. The self-similarity ratio estimation unit 310 then estimates 1/FP(p) as the self-similarity ratio, using a function FP that monotonically decreases with the value of p. Note that the self-similarity ratio estimation unit 310 may measure the length of the period of the function by a method other than the above method of detecting maxima.

Thus, the self-similarity ratio estimation unit 310 calculates the period of variation of the autocorrelation function of the input image 121 or the N-enlarged image 122, determines a larger value of K when the period of variation is shorter, and estimates the self-similarity ratio as 1/K.

Alternatively, as a simpler method, the self-similarity ratio estimation unit 310 may detect a pixel amplitude amount E in the N-enlarged image 122 based on a tendency that a pixel amplitude is small in the case of a fine texture and large in the case of a coarse texture, estimate a self-similarity ratio using a function that monotonically increases with the value of E, and output the estimated self-similarity ratio as the self-similarity ratio information 330. Here, the pixel amplitude amount can be derived using a sum of absolute differences between adjacent pixels in a region around the target block, an energy value of a high-frequency component, or the like. The energy value of the high-frequency component may be calculated using, for example, a sum of absolute values or a sum of squares of pixel values of an image obtained as a result of high-pass filtering.

That is, the self-similarity ratio estimation unit 310 may calculate energy of a high-frequency component of the input image 121 or the N-enlarged image 122, determine a larger value of K when the energy is smaller, and estimate the self-similarity ratio as 1/K.

As an alternative, the self-similarity ratio estimation unit 310 may calculate a sum of absolute differences between adjacent pixels of the input image 121 or the N-enlarged image 122, determine a larger value of K when the sum of absolute differences is smaller, and estimate the self-similarity ratio as 1/K.

The self-similarity ratio estimation unit 310 may also calculate the self-similarity ratio information 330 based on the N-enlarged image 122 by a method other than the above methods. Moreover, the self-similarity ratio estimation unit 310 may calculate the self-similarity ratio information 330 not based on the N-enlarged image 122 but based on the input image 121 or the neighboring N-enlarged image 324.

The 1/K reduction unit 304 reduces the neighboring N-enlarged image 324 by 1/K using a method such as bicubic interpolation, when the self-similarity ratio indicated by the self-similarity ratio information 330 is 1/K. The 1/K reduction unit 304 thus outputs the neighboring M-enlarged image 225. In other words, the neighboring M-enlarged image 225 is an image obtained by enlarging the neighboring region of the target block in the input image 121 by the factor M, where M=N/K.

Note that, in the N enlargement unit 101, a factor may be separately set in each of the horizontal and vertical directions.

(Operation Example of the Super-Resolution Processor 300)

Figure 11:
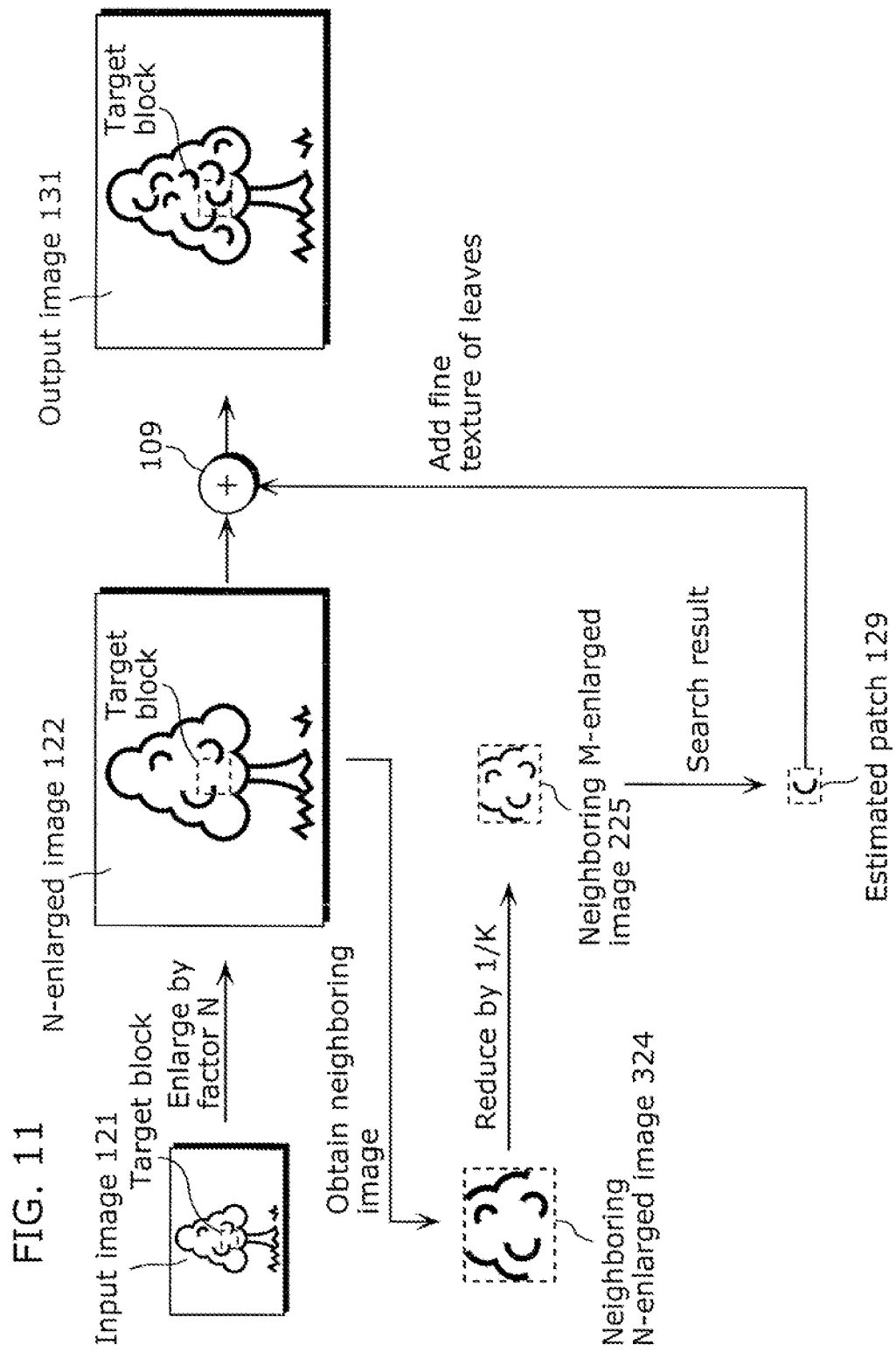
FIG. 11 is a diagram showing an operation example of the super-resolution processor according to the third embodiment of the present invention.

FIG. 11 shows a specific operation example of the super-resolution processor 300. FIG. 11 shows an example where the input image 121 is an image containing a texture of leaves. Throughout the entire operation, the super-resolution processor 300 processes the input image 121 in units of blocks of a predetermined size. Note that the unit of processing is not limited to a fixed-size block, and may be a variable block according to a local feature of the image. Besides, the unit of processing is not limited to a rectangular block, and may have an arbitrary shape such as a circle or a polygon.

The N-enlarged image 122 generated by enlarging the input image 121 by the factor N is an image that lacks detail, where the texture of leaves has only coarse grain enlarged by the factor N. This is because, even though a fine-grained texture is originally contained, the texture is broken and so is not represented in the input image 121 due to low resolution. In the N-enlarged image 122 shown in FIG. 11, a region of a target block indicated by a dotted box has little texture component, but it can be estimated that a fine texture component is originally present in this region.

In order to add a fine texture to the target block, the super-resolution processor 300 performs the following processing.

First, the 1/K reduction unit 304 generates the neighboring M-enlarged image 225 by reducing, by 1/K, the neighboring N-enlarged image 324 obtained by the neighboring image obtainment unit 303. That is, the grain of texture contained in the neighboring M-enlarged image 225 is smaller than the grain of texture contained in the N-enlarged image 122.

Next, the patch extraction unit 208 searches the neighboring M-enlarged image 225 for an appropriate texture region, and generates the estimated patch 129. The estimated patch 129 contains a fine texture component not contained in the target block in the N-enlarged image 122.

Following this, the addition unit 109 adds the estimated patch 129 to the N-enlarged image 122, to generate the output image 133 with improved detail.

Typically, a texture in an image has a tendency of having self-similarity like a fractal image. Accordingly, in the case where a fine-grained texture in similarity relation with a texture of an image is added to the image as in the operation of the third embodiment, even if the added texture is different from a texture contained in a true high-resolution image, a natural, detailed image with no visual awkwardness can be generated.

Super-Resolution Processing Method

Figure 12:
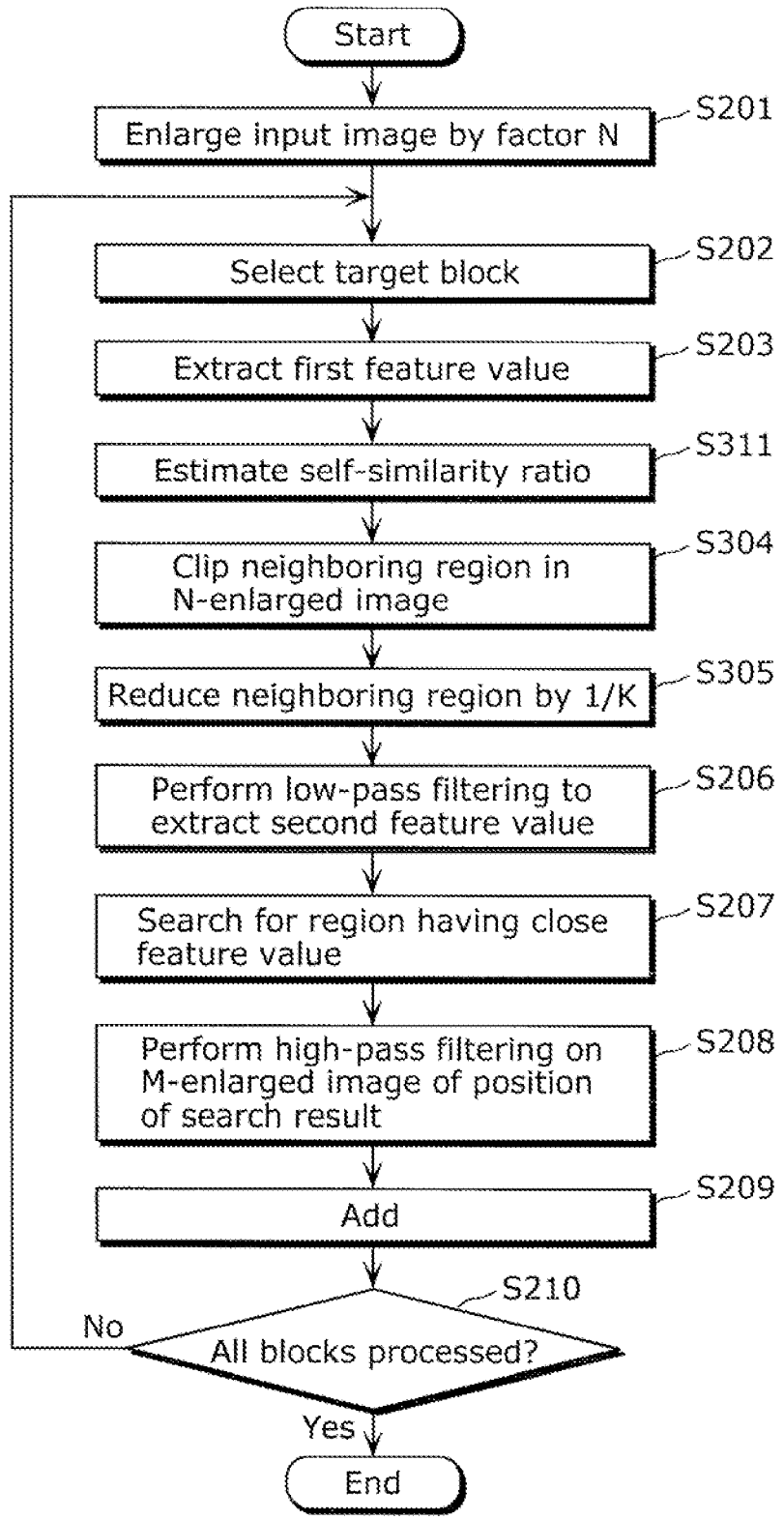
FIG. 12 is a flowchart of a super-resolution processing method according to the third embodiment of the present invention.

FIG. 12 is a flowchart of a super-resolution processing method in the super-resolution processor 300.

Steps S201 to S203 are the same as those in FIG. 4, and so their description is omitted.

After Step S203, the self-similarity ratio estimation unit 310 estimates the self-similarity ratio in the target block in the N-enlarged image 122, by the method described above (Step S311).

The neighboring image obtainment unit 303 clips the image of the neighboring region of the target block in the N-enlarged image 122, to generate the neighboring N-enlarged image 324 (Step S304).

When the estimated self-similarity ratio is 1/K, the 1/K reduction unit 304 reduces, by 1/K, the neighboring N-enlarged image 324 clipped in Step S304, using a pixel interpolation method such as bicubic interpolation or spline interpolation. The 1/K reduction unit 304 thus generates the neighboring M-enlarged image 225 (Step S305). Here, the neighboring M-enlarged image 225 is an image obtained by enlarging the input image 121 by the factor M (M=N/K).

Note that, in Step S311, the self-similarity ratio estimation unit 310 may estimate the self-similarity ratio from the input image 121 or the neighboring N-enlarged image 324, instead of the N-enlarged image 122.

Steps S206 to S211 are the same as those in FIG. 4, and so their description is omitted.

Note that the procedure shown in FIG. 12 is merely one example, and any other procedure may be employed so long as the same advantageous effects can be achieved.

For example, as shown in FIG. 8 mentioned earlier, instead of generating the neighboring M-enlarged image 225 for each target block, the super-resolution processor 300 may generate an M-enlarged image by enlarging the input image 121 by the factor M beforehand, and generate the neighboring M-enlarged image 225 by clipping the neighboring region from the generated M-enlarged image for each block.

Moreover, processing order shown in FIG. 12 is merely one example, and the order may be changed or part of the processing may be performed in parallel, so long as the same processing result can be obtained.

Figure 13:
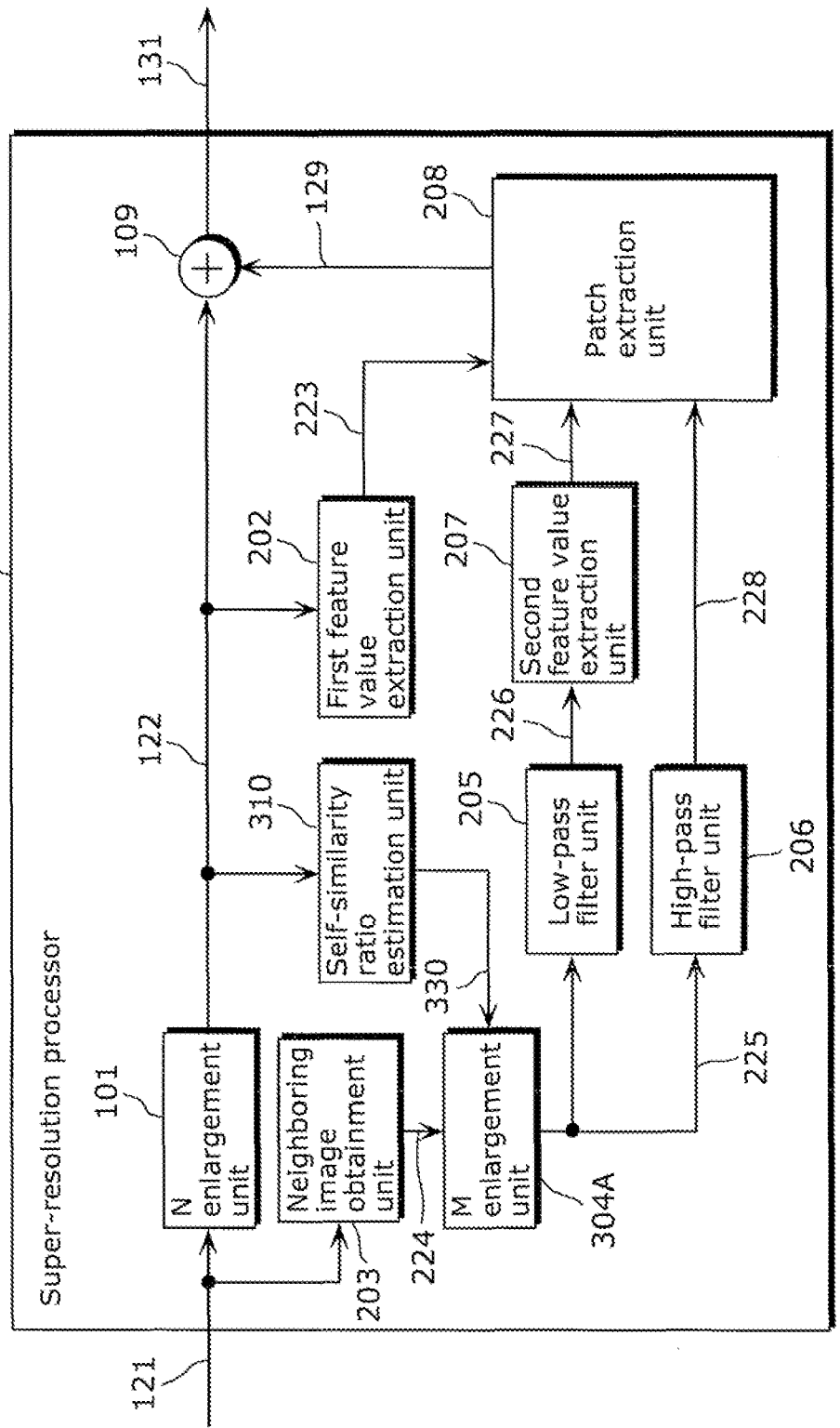
FIG. 13 is a block diagram of a variation of the super-resolution processor according to the third embodiment of the present invention.

In the above description, the super-resolution processor 300 reduces the N-enlarged image 122 by 1/K. However, the super-resolution processor 300 may instead enlarge the input image 121 by the factor M (M=N/K), as in the second embodiment. FIG. 13 is a block diagram showing a structure of a super-resolution processor 300A in this case. The super-resolution processor 300A includes the neighboring image obtainment unit 203 and an M enlargement unit 304A, instead of the neighboring image obtainment unit 303 and the 1/K reduction unit 304 in the structure of the super-resolution processor 300 shown in FIG. 9. The M enlargement unit 304A generates the neighboring M-enlarged image 225 (M-enlarged image) by enlarging the neighboring image 224 (input image 121) by the factor M where M=N/K, when the indicated self-similarity ratio is 1/K.

(Advantageous Effects of the Third Embodiment)

The super-resolution processor 300 according to the third embodiment of the present invention adds a high-frequency component of an image reduced using a self-similarity ratio estimated according to the input image 121, to the N-enlarged image 122. This enables the super-resolution processor 300 to generate a more natural, detailed high-resolution image than the super-resolution processor 200 according to the second embodiment.

Fourth Embodiment

A fourth embodiment of the present invention relates to a variation of the super-resolution processor 300 according to the third embodiment described above.

Figure 14:
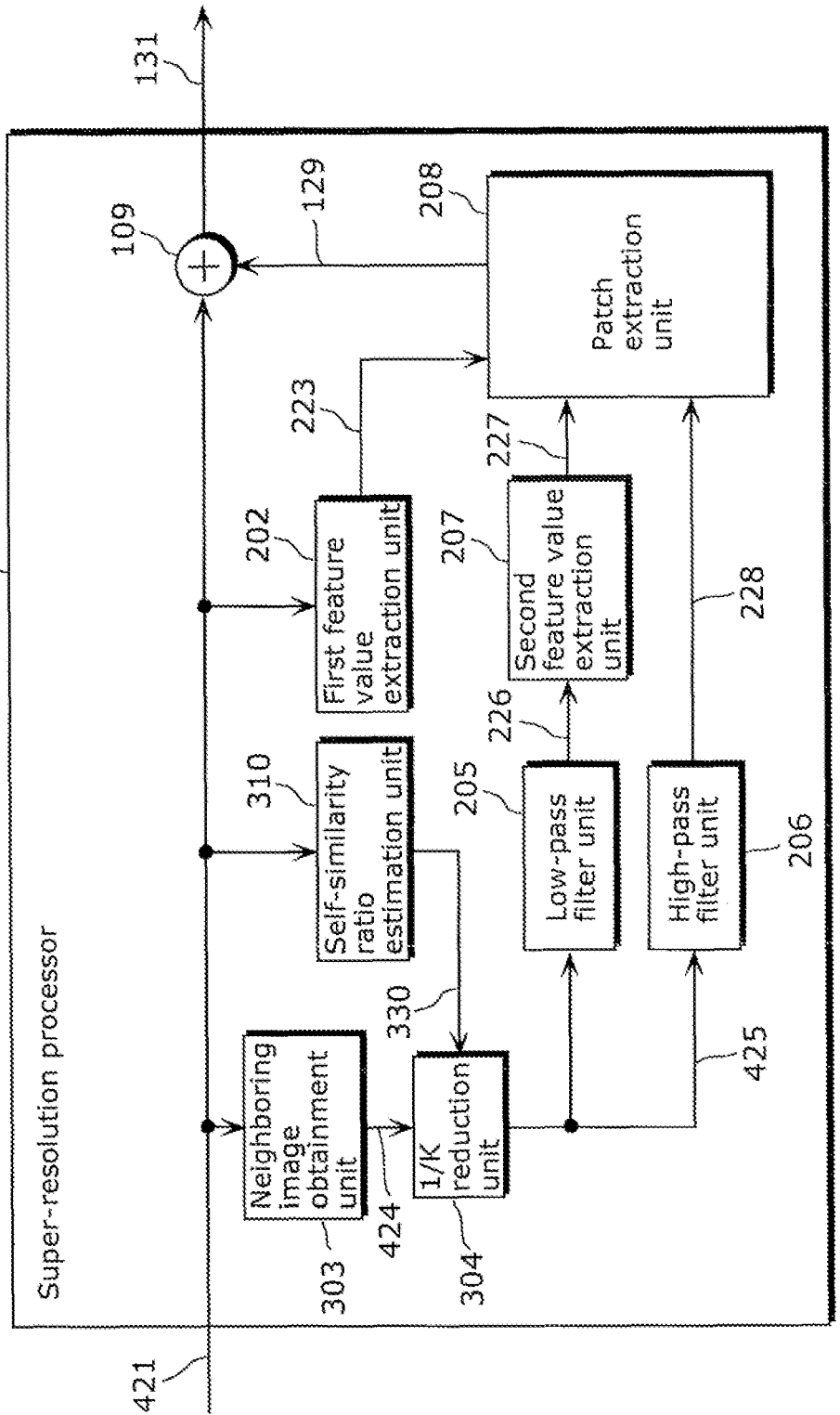
FIG. 14 is a block diagram of a super-resolution processor according to a fourth embodiment of the present invention.

The following describes a super-resolution processor 400 according to the fourth embodiment of the present invention, with reference to FIG. 14.

The super-resolution processor 400 shown in FIG. 14 does not perform enlargement on the input image, unlike the third embodiment. That is, an input image 421 inputted to the super-resolution processor 400 is an image which has already been enlarged, or an image in which a high-frequency component is missing due to image compression or blur at the time of image capture. In other words, the input image 421 and the output image 131 have the same number of pixels, but the high-frequency component missing in the input image 421 is added to the output image 131. Note that such processing of adding a high-frequency component to an image without changing a resolution (the number of pixels) of the image is also called super-resolution processing. The other features are the same as in the super-resolution processor 300.

(Structure and Operation of the Super-Resolution Processor 400)

The super-resolution processor 400 performs super-resolution processing of adding a high-frequency component on the input image 421, to generate the output image 131. The super-resolution processor 400 differs from the super-resolution processor 300 shown in FIG. 9, in that the N enlargement unit 101 is not included. Moreover, not the N-enlarged image 122 but the input image 421 is inputted to each of the addition unit 109, the neighboring image obtainment unit 303, the self-similarity ratio estimation unit 310, and the first feature value extraction unit 202.

The neighboring image obtainment unit 303 clips the image of the neighboring region of the target block in the input image 421, to generate a neighboring image 424. The 1/K reduction unit 304 reduces the neighboring image 424 by 1/K using a pixel interpolation method such as bicubic interpolation or spline interpolation, to generate a neighboring 1/K-reduced image 425.

Note that the neighboring image 424 and the neighboring 1/K-reduced image 425 are equivalent to the neighboring N-enlarged image 324 and the neighboring M-enlarged image 225, in the case where the N-enlarged image 122 is replaced with the input image 421.

The structure and the operation other than the above-mentioned points are the same as those in the third embodiment, and so their description is omitted.

(Operation Example of the Super-Resolution Processor 400)

A specific operation example of the super-resolution processor 400 is the same as that in the third embodiment shown in FIG. 11, except that enlargement by the factor N is omitted, the N-enlarged image 122 is replaced with the input image 421, the neighboring N-enlarged image 324 is replaced with the neighboring image 424, and the neighboring M-enlarged image 225 is replaced with the neighboring 1/K-reduced image 425. Accordingly, its description is omitted.

(Super-Resolution Processing Method)

A super-resolution processing method in the super-resolution processor 400 is the same as the super-resolution processing method in the super-resolution processor 300 according to the third embodiment shown in the flowchart of FIG. 12, except that Step S201 is omitted and the N-enlarged image 122 in the description of the super-resolution processing method of the third embodiment is replaced with the input image 421.

(Advantageous Effects of the Fourth Embodiment)

The super-resolution processor 400 according to the fourth embodiment of the present invention can generate a detailed image as in the third embodiment, for an image which has already been enlarged, or an image which has a sufficient number of pixels but does not contain a sufficient high-frequency component due to image compression or blur at the time of image capture.

Though the structure of not performing enlargement by the factor N is described here based on the structure of the super-resolution processor 300 according to the third embodiment, the same variation may be applied to the structure described in the first or second embodiment.

Fifth Embodiment

A fifth embodiment of the present invention relates to a variation of the super-resolution processor 200 according to the second embodiment described above.

Figure 15:
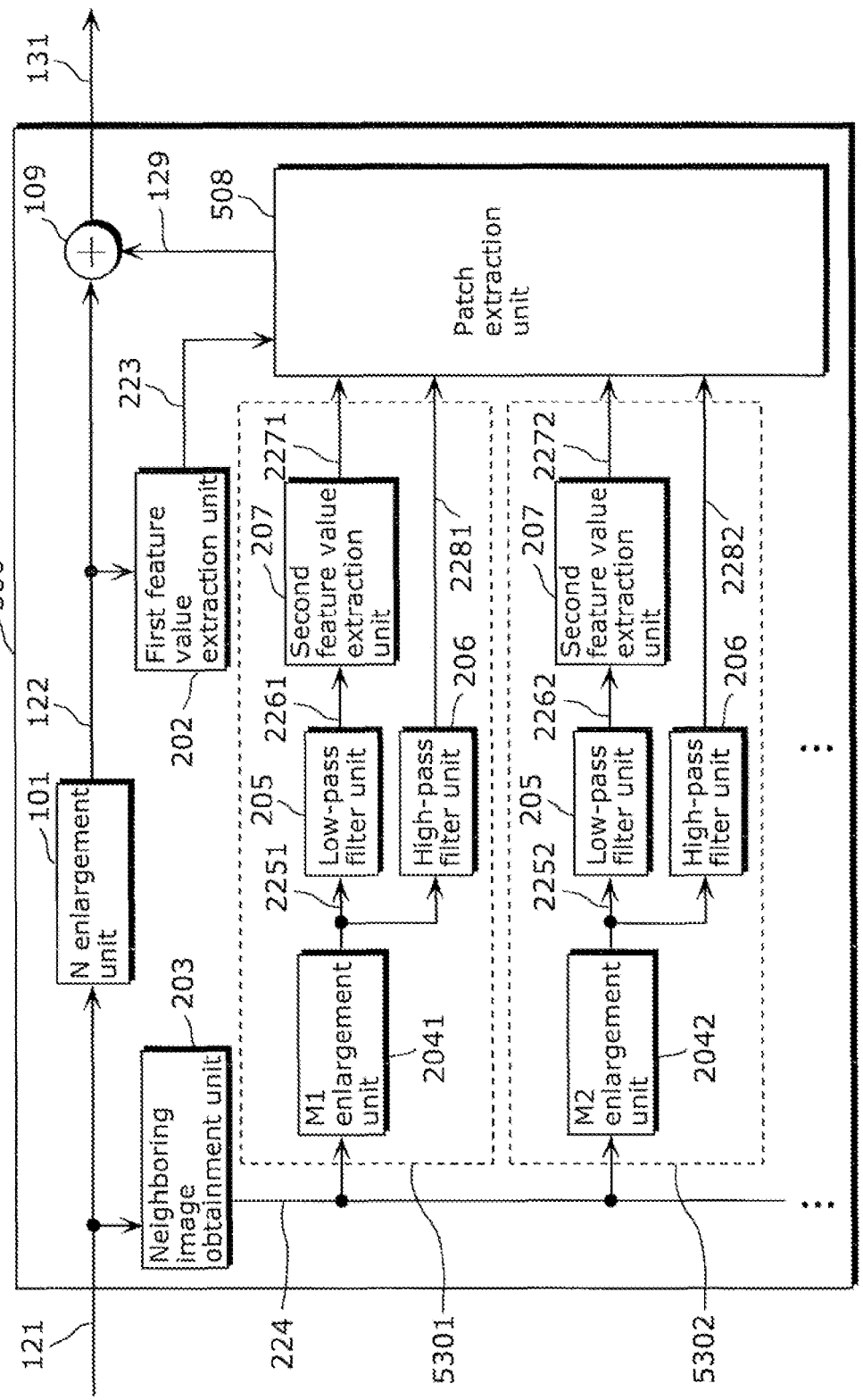
FIG. 15 is a block diagram of a super-resolution processor according to a fifth embodiment of the present invention.

The following describes a super-resolution processor 500 according to the fifth embodiment of the present invention, with reference to FIG. 15.

The super-resolution processor 500 shown in FIG. 15 generates the high-resolution output image 131 by improving the resolution of the input image 121 by the factor N. When performing super-resolution processing on the target block in the input image 121, the super-resolution processor 500 searches neighboring enlarged images generated by enlarging the neighboring region of the target block in the input image 121 by a plurality of different factors M1, M2, . . . , MX, for the estimated patch 129. The super-resolution processor 500 then adds the estimated patch 129 to the N-enlarged image 122, to generate the high-resolution output image 131.

(Structure and Operation of the Super-Resolution Processor 500)

The super-resolution processor 500 includes a plurality of Mx processing units 530x (an M1 processing unit 5301, an M2 processing unit 5302, . . . ), instead of the M enlargement unit 204, the low-pass filter unit 205, the high-pass filter unit 206, and the second feature value extraction unit 207 in the super-resolution processor 200 described above. The super-resolution processor 500 also includes a patch extraction unit 508, instead of the patch extraction unit 208 in the super-resolution processor 200. Here, the number of Mx processing units 530x is X (X≧2).

Each of the plurality of Mx processing units 530x includes an Mx enlargement unit 204x (an M1 enlargement unit 2041, an M2 enlargement unit 2042, . . . ), the low-pass filter unit 205, the high-pass filter unit 206, and the second feature value extraction unit 207.

The N enlargement unit 101, the first feature value extraction unit 202, the neighboring image obtainment unit 203, the low-pass filter unit 205, the high-pass filter unit 206, the second feature value extraction unit 207, and the addition unit 109 are the same as those in the second embodiment, and so their description is omitted.

Factors Mx of the plurality of Mx enlargement units 204x are different from each other in a range of Mx<2.

That is, the Mx enlargement unit 204x enlarges the neighboring image 224 by a factor Mx, to generate a neighboring Mx-enlarged image 225x (a neighboring M1-enlarged image 2251, a neighboring M2-enlarged image 2252, ... ). The low-pass filter unit 205 extracts a low-frequency component of the neighboring Mx-enlarged image 225x as a neighboring low-frequency image 226x (2261, 2262, ... ), by linear filtering or the like. The second feature value extraction unit 207 extracts a feature value from the neighboring low-frequency image 226x, and clips the extracted feature value in units of fixed blocks, to generate a plurality of neighboring feature values 227x (2271, 2272, ... ) Meanwhile, the high-pass filter unit 206 extracts a high-frequency component of the neighboring Mx-enlarged image 225x of the block position determined by the patch extraction unit 508, by linear filtering or the like. The high-pass filter unit 206 outputs the extracted high-frequency component as a neighboring high-frequency image 228x (2281, 2282, ... ).

The patch extraction unit 508 performs the following processing in units of blocks. The patch extraction unit 508 searches the plurality of neighboring feature values 227x for a most similar neighboring feature value 227x, where x=1, 2, ... , X. Here, let PNx denote the number of patches of a neighboring feature value 227x. Then, PN=PN1+PN2+ ... +PNX, where PN is a total number of patches. That is, the patch extraction unit 508 searches PN neighboring feature values 227x for a neighboring feature value 227x most similar to the input feature value 223. Note that the same method as in the second embodiment described above may be used for the search. Having determined the most similar neighboring feature value 227x as a result of the search, the patch extraction unit 508 clips a block at a position corresponding to a block position of the determined neighboring feature value 227x, from a neighboring high-frequency image 228x corresponding to a factor x of the determined neighboring feature value 227x. The patch extraction unit 508 outputs the clipped patch as the estimated patch 129.

(Operation Example of the Super-Resolution Processor 500)

A basic operation example of the super-resolution processor 500 is as described in the second embodiment with reference to FIG. 3, and only differs from the second embodiment in that the enlargement by the factor M in FIG. 3 is expanded to the plurality of enlargements by the factors M1, M2, ... , MX, and the search is performed in the neighboring M1-enlarged image 2251, the neighboring M2-enlarged image 2252, ... , the neighboring MX-enlarged image 225X.

(Super-Resolution Processing Method)

Figure 16:
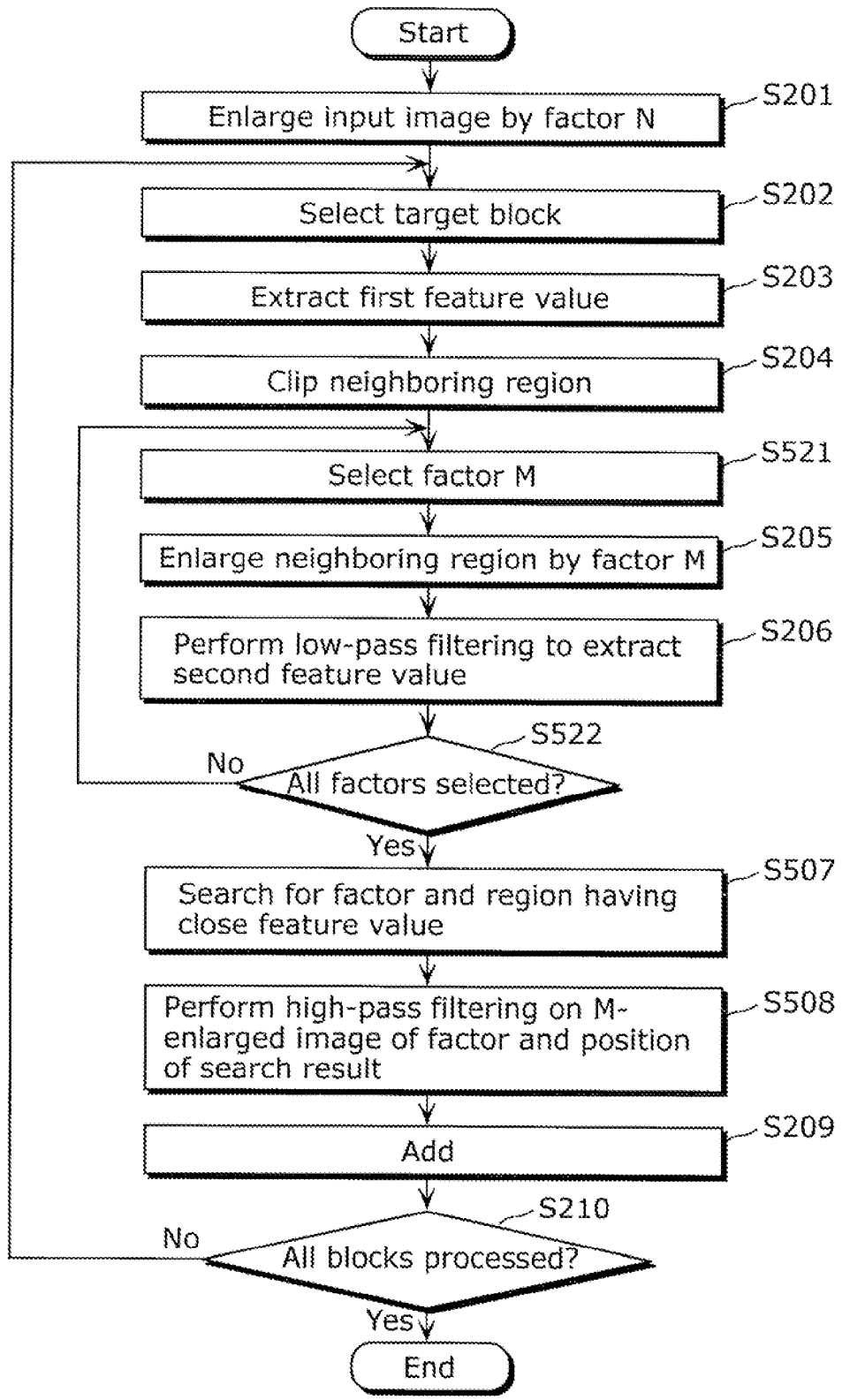
FIG. 16 is a flowchart of a super-resolution processing method according to the fifth embodiment of the present invention.

FIG. 16 is a flowchart of a super-resolution processing method in the super-resolution processor 500.

Steps S201 to S204 are the same as those in FIG. 4, and so their description is omitted.

After Step 204, the super-resolution processor 500 selects a factor Mx (Step S521). It is supposed here that the factor M1 is selected.

Next, the M1 enlargement unit 2041 in the M1 processing unit 5301 enlarges the neighboring image 224 by the factor M1 using a pixel interpolation method such as bicubic interpolation or spline interpolation, to generate the neighboring M1-enlarged image 2251 (Step S205).

Following this, the low-pass filter unit 205 in the M1 processing unit 5301 performs weighting (low-pass filtering) on the neighboring M1-enlarged image 2251 for each frequency band by linear filtering or like, to generate the neighboring low-frequency image 2261. The second feature value extraction unit 207 in the M1 processing unit 5301 extracts the feature value from the neighboring low-frequency image 2261 for each block, to generate the plurality of neighboring feature values 2271 (Step S206). Here, the second feature value extraction unit 207 may extract the plurality of neighboring feature values 2271 directly from the neighboring M1-enlarged image 2251, without performing weighting.

In the case where all factors Mx have not been selected (Step S522: No), the super-resolution processor 500 selects the next factor Mx (e.g., M2) (Step S521), and performs the processing from Step 205 onward using the selected factor M2.

Specifically, the M2 enlargement unit 2042 in the M2 processing unit 5302 enlarges the neighboring image 224 by the factor M2 using a pixel interpolation method such as bicubic interpolation or spline interpolation, to generate the neighboring M2-enlarged image 2252 (Step S205).

Following this, the low-pass filter unit 205 in the M2 processing unit 5302 performs weighting (low-pass filtering) on the neighboring M2-enlarged image 2252 for each frequency band by linear filtering or like, to generate the neighboring low-frequency image 2262. The second feature value extraction unit 207 in the M2 processing unit 5302 extracts the feature value from the neighboring low-frequency image 2262 for each block, to generate the plurality of neighboring feature values 2272 (Step S206).

This processing of Steps S521 to S206 is performed for all factors Mx.

As a result of completing the processing for all factors Mx (Step S522: Yes), a plurality of neighboring feature values F(x, px) corresponding to each of the plurality of factors Mx are generated, where px=1, 2, .... Here, px is an index of each patch extracted from the neighboring Mx-enlarged image 225x.

The patch extraction unit 508 searches the plurality of neighboring feature values F(x, px) for a neighboring feature value F(x, px) close to the input feature value 223 (Step S507). The high-pass filter unit 206 in the Mx processing unit 530x corresponding to the factor found as a result of the search performs high-pass filtering on the neighboring Mx-enlarged image 225x corresponding to the same position as the patch position found as a result of the search, to generate the neighboring high-frequency image 228x. The patch extraction unit 508 outputs the generated neighboring high-frequency image 228x as the estimated patch 129 (Step S508).

The subsequent processing is the same as that in FIG. 4 described above, and so its description is omitted.

Note that the procedure shown in FIG. 16 is merely one example, and any other procedure may be employed so long as the same advantageous effects can be achieved.

For example, as shown in FIG. 8 mentioned earlier, instead of generating the neighboring Mx-enlarged image 225x for each target block, the super-resolution processor 500 may generate an Mx-enlarged image by enlarging the input image 121 by the factor Mx beforehand, and generate the neighboring Mx-enlarged image 225x by clipping the neighboring region from the generated Mx-enlarged image for each block.

Moreover, processing order shown in FIG. 16 is merely one example, and the order may be changed or part of the processing may be performed in parallel, so long as the same processing result can be obtained.

For instance, the series of processing of Steps S201 and S203 and the series of processing of Steps S204 to S522 in FIG. 16 may be reversed in order, or part of the processing may be performed in parallel.

Besides, though an example of calculating the plurality of neighboring feature values 227x corresponding to the plurality of factors Mx in sequence is shown in FIG. 16, part or all of the plurality of neighboring feature values 227x corresponding to the plurality of factors Mx may be calculated in parallel.

Furthermore, though the super-resolution processor 500 includes X Mx processing units 530x in FIG. 15, the super-resolution processor 500 may instead include one Mx processing unit 530x or a smaller number of Mx processing units 530x than X for calculating the plurality of neighboring feature values 227x corresponding to the plurality of factors Mx in sequence.

(Advantageous Effects of the Fifth Embodiment)

The super-resolution processor 500 according to the fifth embodiment of the present invention calculates the plurality of neighboring feature values 227x from the neighboring Mx-enlarged images 225x generated by enlarging the neighboring image 224 by the different factors Mx, and searches the plurality of neighboring feature values 227x for a patch having a feature value most similar to the input feature value 223. This enables the super-resolution processor 500 to generate a more natural, detailed high-resolution image than the super-resolution processor 200 according to the second embodiment.

Though the structure of searching the neighboring Mx-enlarged images 225x, which are generated by enlarging the neighboring image 224 by the different factors Mx, for the estimated patch 129 is described here based on the structure of the super-resolution processor 200 according to the second embodiment, the same variation may be applied to the structure described in the first, third, or fourth embodiment.

Sixth Embodiment

A sixth embodiment of the present invention relates to a variation of the super-resolution processor 200 according to the second embodiment described above.

A super-resolution processor according to the sixth embodiment of the present invention has a function of changing the factor M according to the factor N, in addition to the functions of the super-resolution processor 200 according to the second embodiment. A structure of the super-resolution processor according to the sixth embodiment is the same as that of the super-resolution processor 200 shown in FIG. 2, and so its description is omitted.

Figure 17:
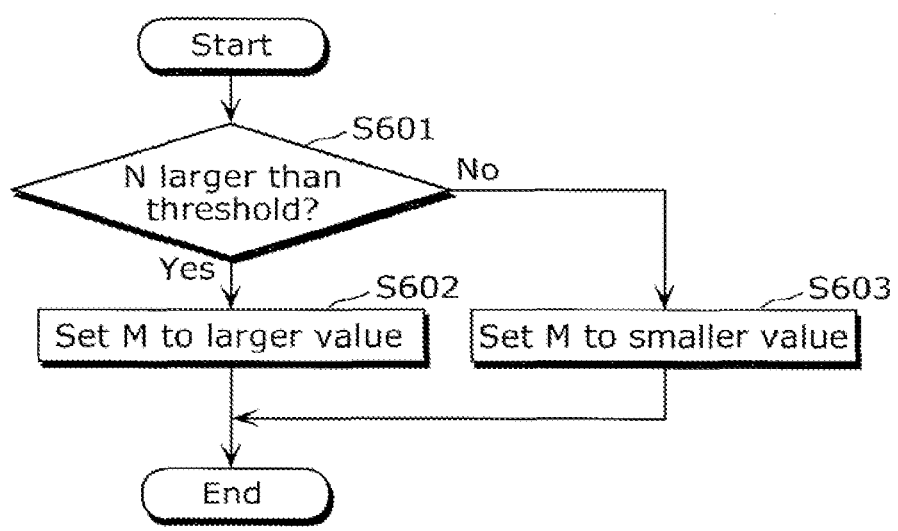
FIG. 17 is a flowchart of factor determination processing according to a sixth embodiment of the present invention.

FIG. 17 is a flowchart of determination of the factor M by the super-resolution processor according to the sixth embodiment.

In the case where the factor N is larger than a predetermined threshold (Step S601: Yes), the M enlargement unit 204 sets the factor M to a first value (Step S602). In the case where the factor N is equal to or smaller than the predetermined threshold (Step S601: No), the M enlargement unit 204 sets the factor M to a second value that is smaller than the first value (Step S603).

Alternatively, the M enlargement unit 204 may determine a plurality of thresholds beforehand, and set the factor M so that the factor M is larger when the factor N is larger.

For example, the factor N is designated by an external apparatus. Alternatively, the super-resolution processor may determine the factor N in accordance with the resolution of the input image 121 and the display resolution of the display device connected in a stage subsequent to the super-resolution processor.

Thus, the super-resolution processor according to the sixth embodiment of the present invention can change the factor M according to the factor N. This enables the super-resolution processor to generate a more natural, detailed high-resolution image.

Though the structure of changing the factor M according to the factor N is described here based on the structure of the super-resolution processor 200 according to the second embodiment, the same variation may be applied to the structure described in the first, third, fourth, or fifth embodiment.

Seventh Embodiment

Figure 18:
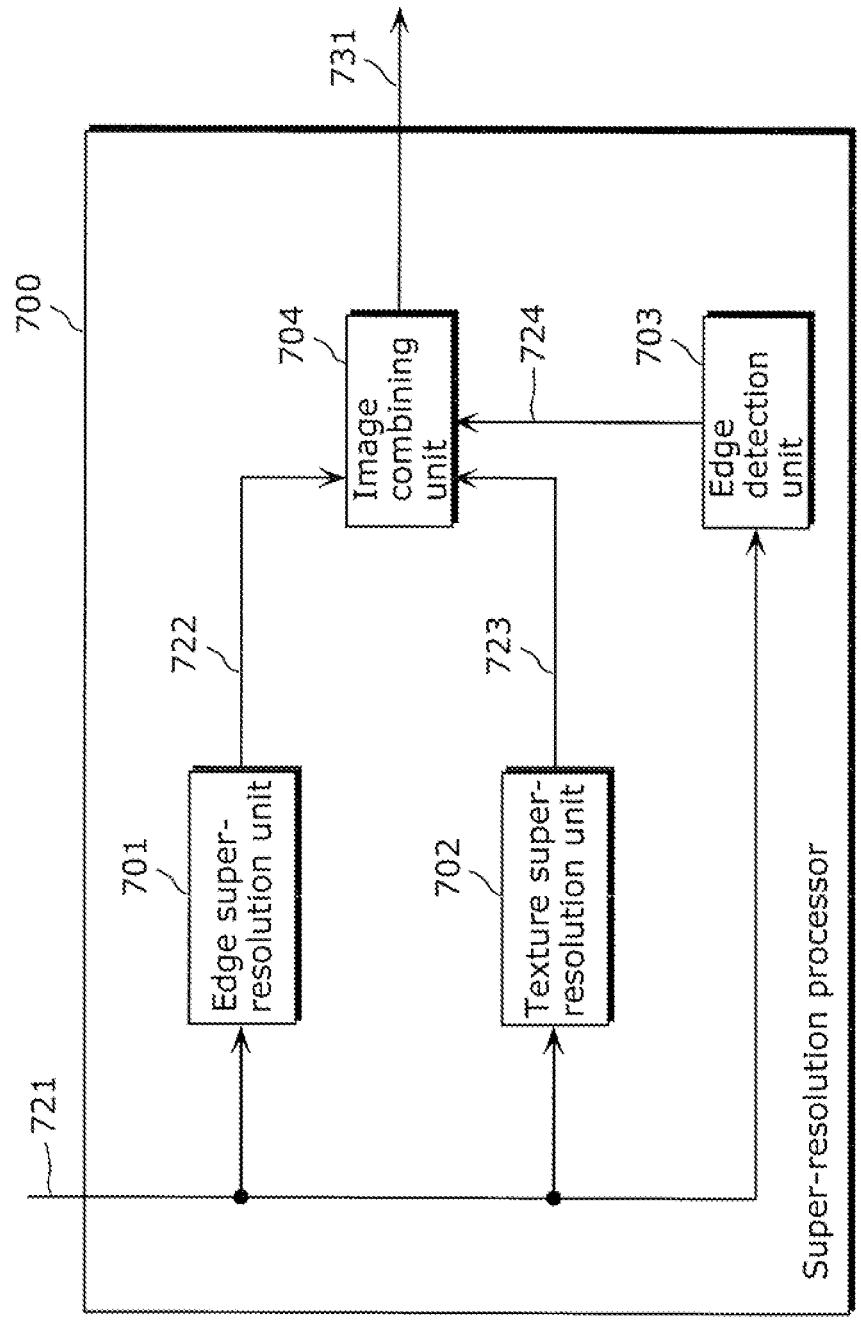
FIG. 18 is a block diagram of a super-resolution processor according to a seventh embodiment of the present invention.

The following describes a super-resolution processor 700 according to a seventh embodiment of the present invention, with reference to FIG. 18.

The super-resolution processor 700 shown in FIG. 18 performs edge detection based on a low-resolution input image 721, and selectively adopts, based on a result of the detection, high-resolution images generated by two types of super-resolution methods.

(Structure and Operation of the Super-Resolution Processor 700)

The super-resolution processor 700 includes: an edge super-resolution unit 701 that generates an edge high-resolution image 722 from the input image 721; a texture super-resolution unit 702 that generates a texture high-resolution image 723 from the input image 721; an edge detection unit 703 that generates edge information 724 from the input image 721; and an image combining unit 704 that generates a high-resolution output image 731 using the edge high-resolution image 722, the texture high-resolution image 723, and the edge information 724.

The edge super-resolution unit 701 is, for example, the super-resolution processor described in the background art section, and performs super-resolution processing to generate the edge high-resolution image 722 of a resolution increased from the input image 721. In the edge high-resolution image 722, though sufficient detail cannot be attained in a fine texture portion, certain effects are attained in an edge portion. The edge super-resolution unit 701 is not limited to the super-resolution processor described in the background art section, and may perform super-resolution processing using any other super-resolution method. Moreover, the edge super-resolution unit 701 may generate the edge high-resolution image 722, by simply enlarging the input image 721 using a pixel interpolation method such as bicubic interpolation or spline interpolation. In this case, the edge super-resolution unit 701 can generate a sharp high-resolution image in an edge region, through edge enhancement by emphasizing a high-frequency component and the like.

The texture super-resolution unit 702 performs super-resolution processing on the input image 721 using the super-resolution processing method described in any of the first to sixth embodiments, to generate the texture high-resolution image 723. In the texture high-resolution image 723, a fine, favorable high-resolution image is attained in a texture portion. However, in the texture high-resolution image 723, an image in an edge portion contains an error as a result of, for example, adding a high-frequency component of an edge whose neighborhood is reduced.

The edge detection unit 703 detects an edge in the input image 721. Specifically, the edge detection unit 703 detects an amount of edge for each pixel in the input image 721, and outputs a result of the detection as the edge information 724. Examples of typical edge detection methods include the use of the Canny filter and the use of the Sobel filter. The edge detection unit 703 may use any of these methods. The edge detection unit 703 may also use an edge detection method other than these methods.

The image combining unit 704 combines the edge high-resolution image 722 and the texture high-resolution image 723. Specifically, for a region determined to have a large amount of edge based on the edge information 724, the image combining unit 704 preferentially selects the edge high-resolution image 722. For a region determined to have a small amount of edge, on the other hand, the image combining unit 704 preferentially selects the texture high-resolution image 723. In the case where the amount of edge is neither large nor small, the image combining unit 704 may average the edge high-resolution image 722 and the texture high-resolution image 723, and select the averaged image.

Instead of switching between the edge high-resolution image 722 and the texture high-resolution image 723 according to the amount of edge, the image combining unit 704 may combine the edge high-resolution image 722 and the texture high-resolution image 723 with variable weights. Specifically, for a region having a larger amount of edge than a predetermined threshold in the input image 721, the image combining unit 704 combines the edge high-resolution image 722 and the texture high-resolution image 723 at a ratio in which the edge high-resolution image 722 is higher than the texture high-resolution image 723. For a region having a smaller amount of edge than the predetermined threshold, the image combining unit 704 combines the edge high-resolution image 722 and the texture high-resolution image 723 at a ratio in which the edge high-resolution image 722 is lower than the texture high-resolution image 723.

The image combining unit 704 outputs such a combined image, as the output image 731.

(Advantageous Effects of the Seventh Embodiment)

The super-resolution processor 700 according to the seventh embodiment of the present invention adaptively selects super-resolution processing suitable for an edge portion or super-resolution processing suitable for a texture portion, according to the amount of edge. As a result, a high-resolution image in which both edges and textures are improved in detail can be generated.

Eighth Embodiment

The processing described in each of the above embodiments can be easily implemented on an independent computer system, by recording a program for realizing the super-resolution processing method described in the embodiment on a recording medium such as a flexible disk.

Figure 19A:
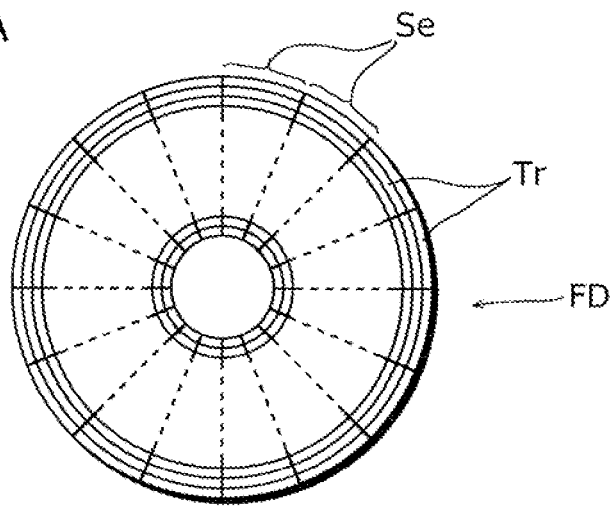
FIG. 19A is a diagram showing an example of a physical format of a recording medium according to an eighth embodiment of the present invention.
Figure 19B:
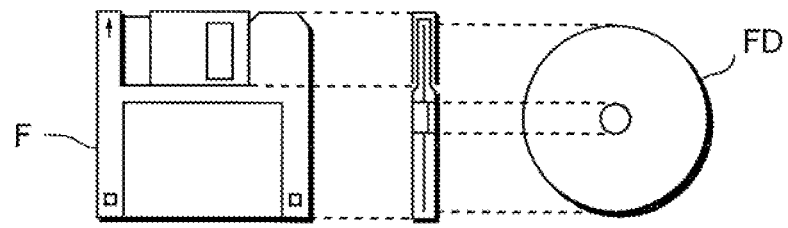
FIG. 19B is a diagram showing a structure of the recording medium according to the eighth embodiment of the present invention.
Figure 19C:
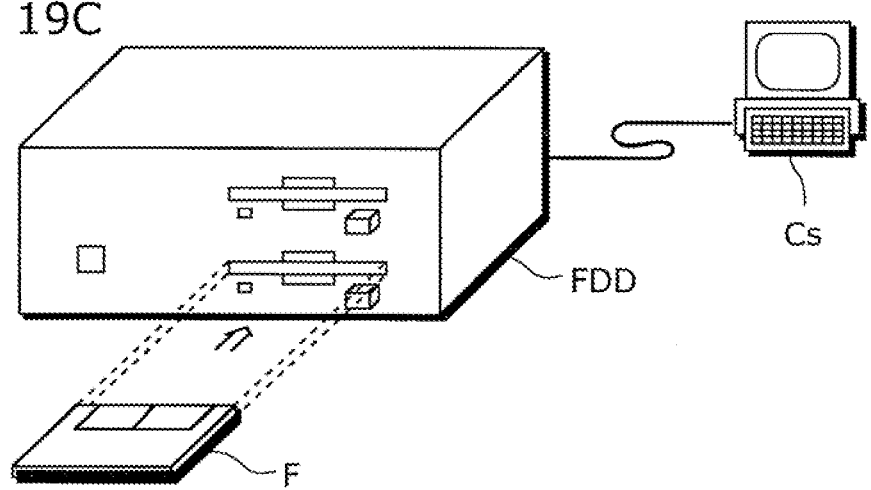
FIG. 19C is a diagram showing a structure of a computer system according to the eighth embodiment of the present invention.

FIGS. 19A and 19C are diagrams explaining the case where a flexible disk storing a program for the super-resolution processing method of any of the first to seventh embodiments is used to implement the super-resolution processing method by a computer system.

FIG. 19B shows a front appearance of the flexible disk, a cross section of the flexible disk, and the flexible disk as a recording medium body. FIG. 19A shows an example of a physical format of the flexible disk as the recording medium body. A flexible disk FD is contained in a case F, and a plurality of tracks Tr are concentrically formed on a surface of the flexible disk FD from outer to inner peripheries. Each track is divided into 16 sectors Se in an angular direction. This being so, in the flexible disk FD storing the above-mentioned program, the super-resolution processing method as the program is recorded in an area allocated on the flexible disk FD.

FIG. 19C shows a structure of recording and reproducing the program on the flexible disk FD. In the case of recording the program on the flexible disk FD, the super-resolution processing method as the program is written from a computer system Cs via a flexible disk drive FDD. In the case of implementing the super-resolution processing method on the computer system Cs by the program recorded on the flexible disk FD, the program is read from the flexible disk FD and transferred to the computer system Cs via the flexible disk drive FDD.

Though the above describes an example of using the flexible disk as the recording medium, an optical disc may equally be used. Moreover, the recording medium is not limited to such, and any recording medium such as a hard disk, a CD-ROM, a memory card, a ROM cassette, and the like is applicable so long as the program can be recorded.

Ninth Embodiment

Figure 20:
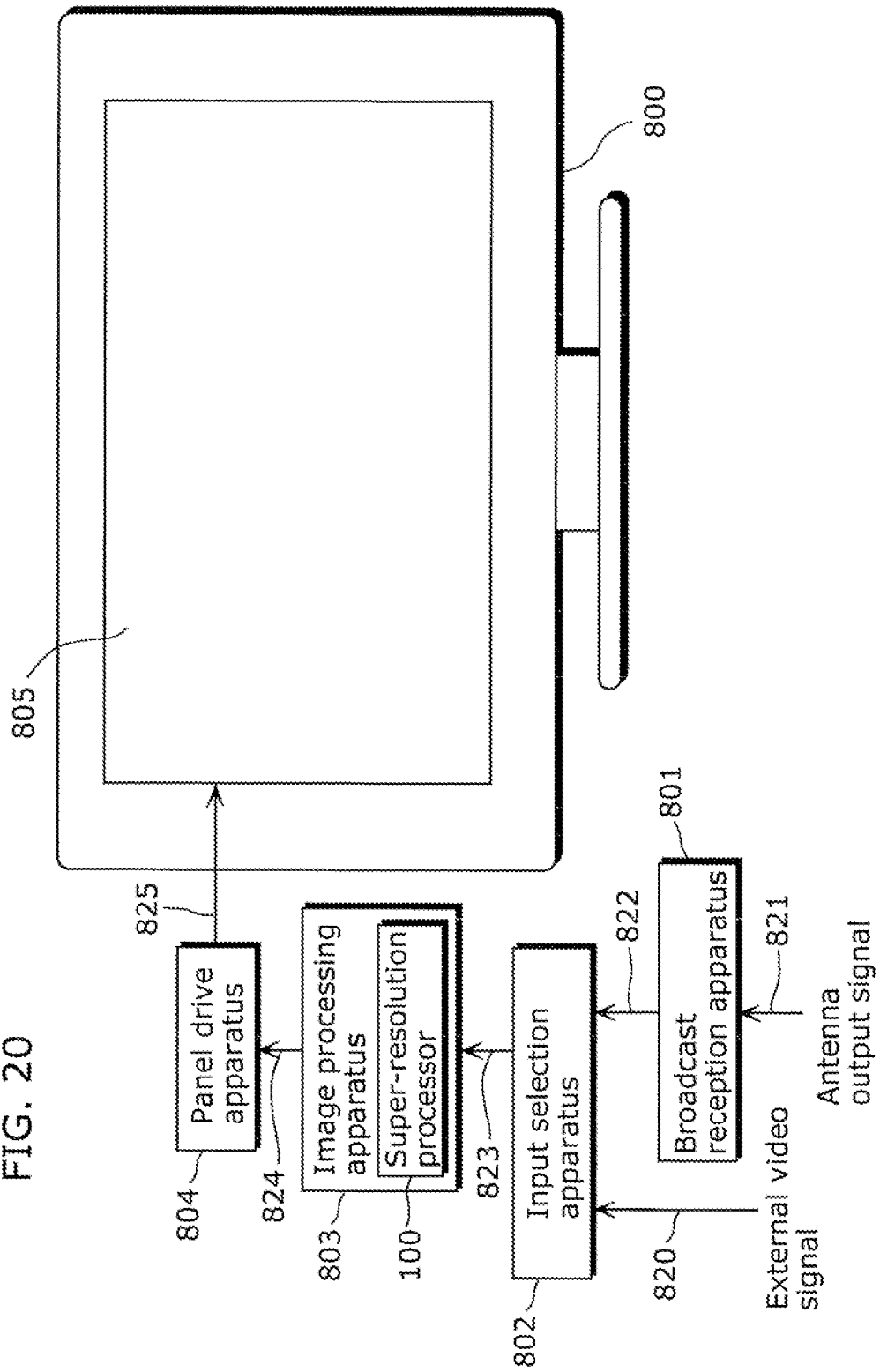
FIG. 20 is a block diagram of a television receiver according to a ninth embodiment of the present invention.
Figure 21:
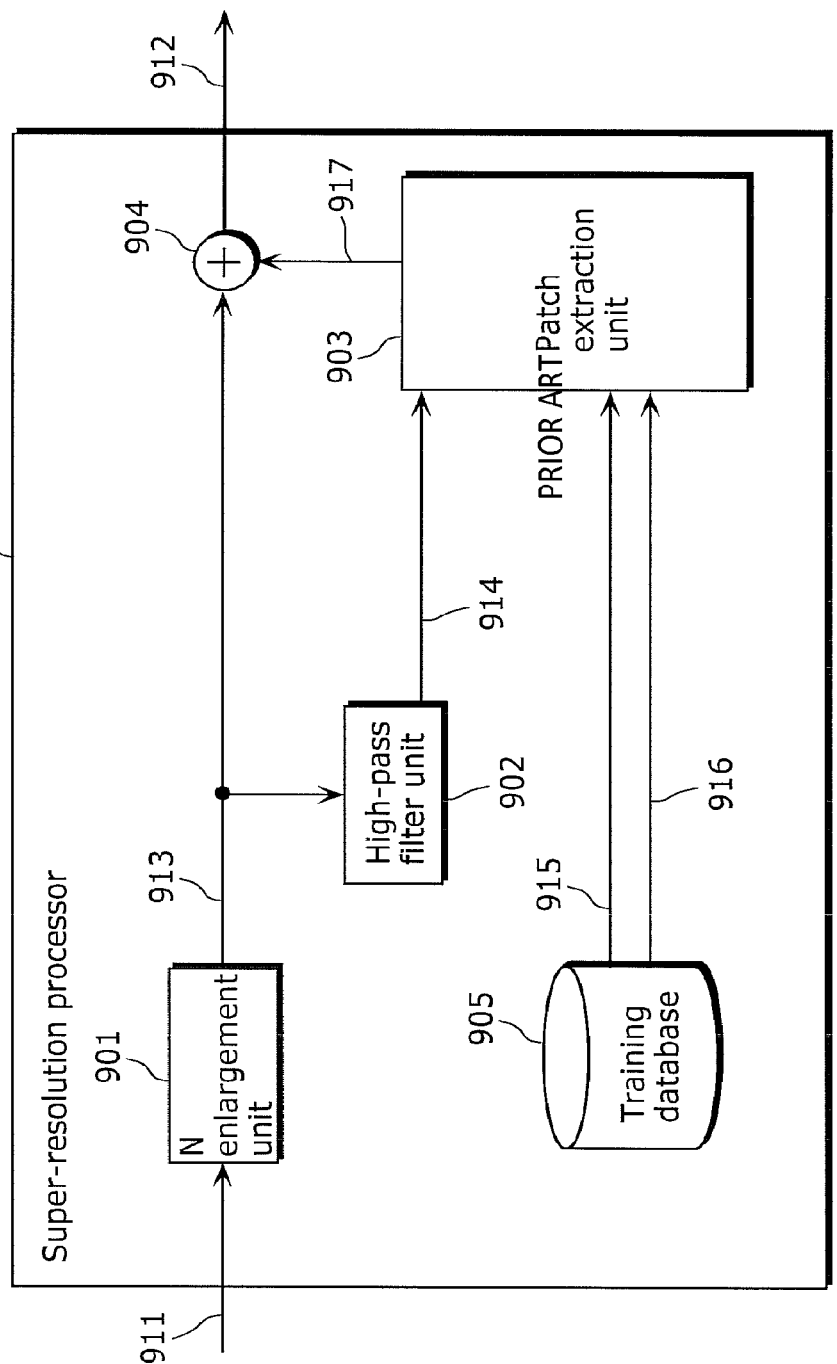
FIG. 21 is a block diagram of a conventional super-resolution processor.
Figure 22:
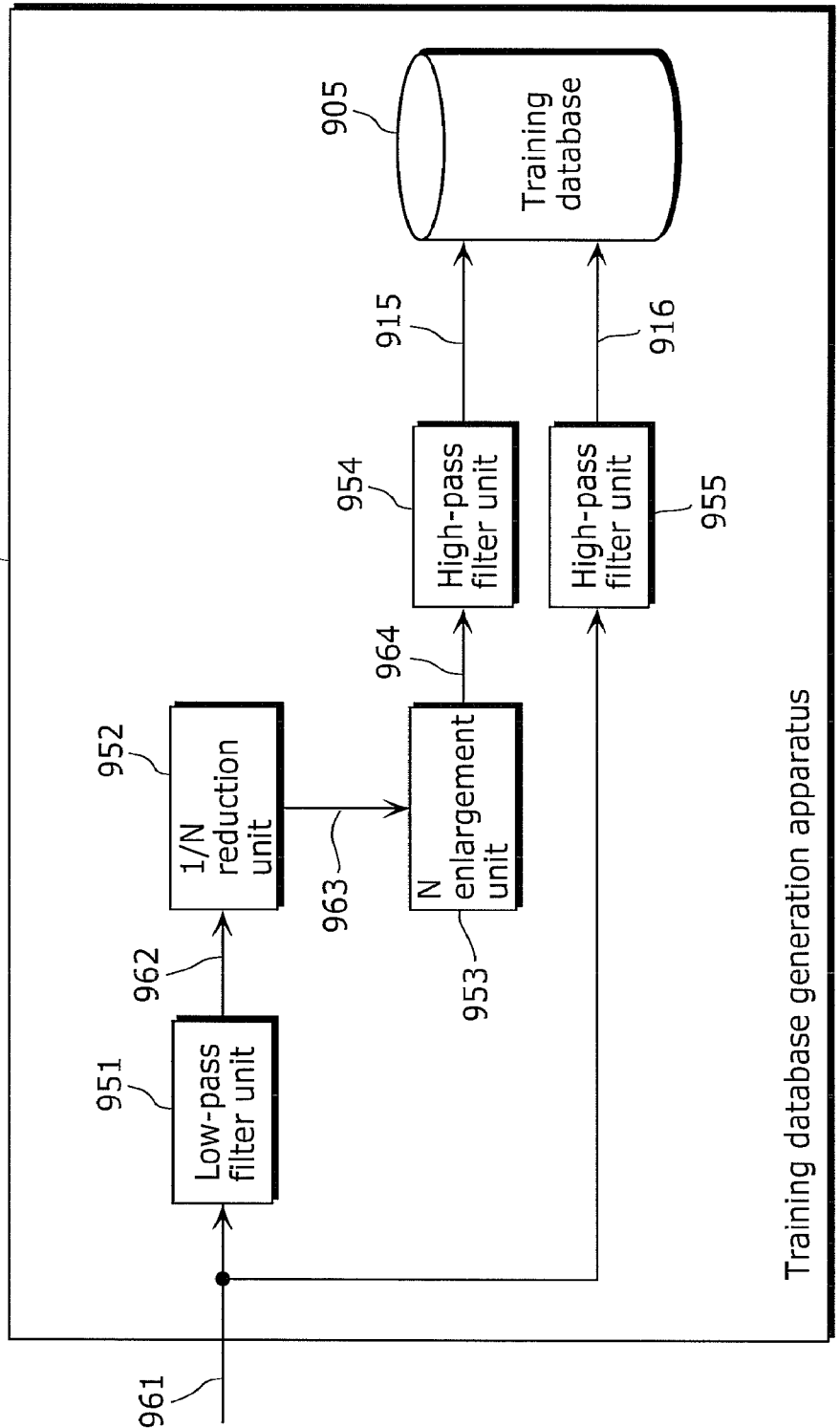
FIG. 22 is a block diagram of a conventional training database generation apparatus.

In a ninth embodiment of the present invention, a television receiver using a super-resolution processor, a super-resolution processing method, and a super-resolution processing program is described with reference to FIG. 20.

A television receiver 800 includes a broadcast reception apparatus 801, an input selection apparatus 802, an image processing apparatus 803, a panel drive apparatus 804, and a display panel 805. Though the apparatuses 801 to 804 are located outside the television receiver 800 in FIG. 20 for illustration purposes, the apparatuses 801 to 804 are actually located inside the television receiver 800.

The broadcast reception apparatus 801 receives a broadcast wave from an antenna output signal 821 outputted from an external antenna (not shown), and outputs a video signal obtained by demodulating the broadcast wave, as a broadcast video signal 822.

The input selection apparatus 802 selects one of the broadcast video signal 822 and an external video signal 820 that is outputted from an external video appliance such as a DVD or BD (Blu-ray Disc) recorder or a DVD or BD player, according to the user's selection. The input selection apparatus 802 outputs the selected video signal as an input video signal 823.

The image processing apparatus 803 performs, in the case where the input video signal 823 is an interlace signal, I/P conversion of converting the input video signal 823 to a progressive signal, and image quality improvement processing of improving contrast for the input video signal 823. Moreover, the image processing apparatus 803 includes the super-resolution processor 100 according to the first embodiment of the present invention, and performs super-resolution processing using the above-mentioned super-resolution processing method or super-resolution processing program to the input video signal 823. The image processing apparatus 803 outputs the processed signal as a quality-improved video signal 824. The image processing apparatus 803 may include the super-resolution processor according to any of the second to seventh embodiments of the present invention.

The panel drive apparatus 804 converts the quality-improved video signal 824 to a dedicated signal for driving the display panel 805, and outputs the converted signal as a panel drive video signal 825.

The display panel 805 converts an electrical signal to an optical signal according to the panel drive video signal 825, and displays desired video based on the converted optical signal.

In such a way, the super-resolution processor, the super-resolution processing method, and the super-resolution processing program according to each of the above embodiments can be used in the television receiver 800. This allows the television receiver 800 to achieve the advantageous effects described in the embodiment. Note that the super-resolution processor, the super-resolution processing method, and the super-resolution processing program according to each of the above embodiments are not limited to use in a television receiver, and may equally be used in various digital video appliances such as a recorder, a player, and a mobile appliance. In all cases, the advantageous effects described in the embodiment can be achieved. Examples of the recorder include a DVD recorder, a BD recorder, and a hard disk recorder. Examples of the player include a DVD player and a BD player. Examples of the mobile appliance include a mobile phone and a PDA (Personal Digital Assistant).

(Other Variations)

Although the present invention has been described by way of the above embodiments, the present invention is not limited to the above embodiments. For example, the present invention also includes the following variations.

(1) Each of the above apparatuses is actually a computer system that includes a microprocessor, a ROM, a RAM, a hard disk unit, a display unit, a keyboard, a mouse, and the like. A computer program is stored on the RAM or the hard disk unit. Functions of each of the apparatuses can be achieved by the microprocessor operating in accordance with the computer program. The computer program mentioned here is a combination of a plurality of instruction codes that represent instructions to a computer for achieving predetermined functions.

(2) The components that constitute each of the above apparatuses may be partly or wholly realized by one system LSI (Large Scale Integration). The system LSI is an ultra-multi-functional LSI produced by integrating a plurality of components on one chip, and is actually a computer system that includes a microprocessor, a ROM, a RAM, and the like. A computer program is stored on the RAM. Functions of the system LSI can be achieved by the microprocessor operating in accordance with the computer program.

(3) The components that constitute each of the above apparatuses may be partly or wholly realized by an IC card or a single module that is removably connectable to the apparatus. The IC card or the module is a computer system that includes a microprocessor, a ROM, a RAM, and the like. The IC card or the module may include the above-mentioned ultra-multi-functional LSI. Functions of the IC card or the module can be achieved by the microprocessor operating in accordance with the computer program. The IC card or the module may be tamper resistant.

(4) The present invention may also be the method described above. The present invention may also be a computer program that realizes the method by a computer. The present invention may also be a digital signal formed by the computer program.

The present invention may also be a computer-readable recording medium, such as a flexible disk, a hard disk, a CD-ROM, an MO (Magneto Optical Disc), a DVD, a DVD-ROM, a DVD-RAM, a BD, or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. In this case, the computer program may be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

(5) The above embodiments and variations may be freely combined.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention is applicable to a super-resolution processor. Moreover, the present invention is useful for a digital video appliance such as a television receiver, a DVD recorder, a BD recorder, a hard disk recorder, a DVD player, a BD player, and so on. The present invention is also useful for an image processing method and an image processing program.

What is claimed is:

1. A super-resolution processor that performs super-resolution processing on an input image to generate an output image of a higher resolution than the input image, the super-resolution processor comprising:
   an N enlargement unit configured to generate an N-enlarged image by enlarging a size of the input image by a factor N, where N is a real number larger than 1;
   an M enlargement unit configured to generate an M-enlarged image by enlarging the size of the input image by a factor M, where M is a real number larger than 1;
   a high-pass filter unit configured to extract a high-frequency component of the M-enlarged image, as an M-enlarged high-frequency image;
   a patch extraction unit configured to extract an estimated patch of a predetermined size from the M-enlarged high-frequency image, the estimated patch being a region of the M-enlarged high-frequency image; and
   an addition unit configured to add the estimated patch to a processing target block of the predetermined size in the N-enlarged image, to generate the output image,
   wherein M is smaller than N.

2. The super-resolution processor according to claim 1, wherein the patch extraction unit is configured to extract the estimated patch, from a neighboring region of a position of the processing target block in the M-enlarged high-frequency image.

3. The super-resolution processor according to claim 1, further comprising:
   a first feature value extraction unit configured to extract an input feature value, the input feature value being a feature value of the processing target block in the N-enlarged image; and
   a second feature value extraction unit configured to extract a plurality of first neighboring feature values, each of the plurality of first neighboring feature values being a feature value of a different one of a plurality of patches in the M-enlarged image, the plurality of patches each having the predetermined size,
   wherein the patch extraction unit is configured to calculate a similarity between the input feature value and each of the plurality of first neighboring feature values, and extract, as the estimated patch, a region in the M-enlarged high-frequency image corresponding to any of: (1) one first neighboring feature value having a highest similarity; (2) a predetermined number of first neighboring feature values in a decreasing order of similarity; and (3) first neighboring feature values each having a similarity equal to or higher than a predetermined threshold, from among the plurality of first neighboring feature values.

4. The super-resolution processor according to claim 1, further comprising:
a self-similarity ratio estimation unit configured to estimate a self-similarity ratio of the N-enlarged image,
wherein the M enlargement unit is configured to generate the M-enlarged image by enlarging the input image by the factor M where M=N/K, when the self-similarity ratio is 1/K.

5. The super-resolution processor according to claim 4, wherein the self-similarity ratio estimation unit is configured to calculate a period of variation of an autocorrelation function of the input image or the N-enlarged image, determine a larger value of K when the period of variation is shorter, and estimate the self-similarity ratio as 1/K.

6. The super-resolution processor according to claim 4, wherein the self-similarity ratio estimation unit is configured to calculate energy of a high-frequency component of the input image or the N-enlarged image, determine a larger value of K when the energy is smaller, and estimate the self-similarity ratio as 1/K.

7. The super-resolution processor according to claim 4, wherein the self-similarity ratio estimation unit is configured to calculate a sum of absolute differences between adjacent pixels of the input image or the N-enlarged image, determine a larger value of K when the sum of absolute differences is smaller, and estimate the self-similarity ratio as 1/K.

8. The super-resolution processor according to claim 3, wherein the M enlargement unit is further configured to generate an M1-enlarged image by enlarging the input image by a factor M1, where M1 is larger than 1, M1 is smaller than N, and different from M,
the high-pass filter unit is further configured to extract a high-frequency component of the M1-enlarged image, as an M1-enlarged high-frequency image,
the second feature value extraction unit is further configured to extract a plurality of second neighboring feature values, each of the plurality of second neighboring feature values being a feature value of a different one of a plurality of patches in the M1-enlarged image, the plurality of patches each having the predetermined size,
the patch extraction unit is further configured to calculate a similarity between the input feature value and each of the plurality of second neighboring feature values, and
the patch extraction unit is configured to extract the estimated patch from a region in the M-enlarged high-frequency image or the M1-enlarged high-frequency image corresponding to any of: (1) one first neighboring feature value or second neighboring feature value having a highest similarity; (2) a predetermined number of first neighboring feature values or second neighboring feature values in a decreasing order of similarity; and (3) first neighboring feature values or second neighboring feature values each having a similarity equal to or higher than a predetermined threshold, from among the plurality of first neighboring feature values and the plurality of second neighboring feature values.

9. The super-resolution processor according to claim 3, wherein the patch extraction unit is configured to calculate, as the similarity, a sum of absolute differences or a sum of squared differences between the input feature value and each of the plurality of first neighboring feature values.

10. The super-resolution processor according to claim 1, wherein the M enlargement unit is configured to set M to a first value in the case where N is larger than a predetermined threshold, and set M to a second value in the case where N is equal to or smaller than the predetermined threshold, the second value being smaller than the first value.

11. A super-resolution processor that performs super-resolution processing on an input image to generate an output image, the super-resolution processor comprising:
a 1/K reduction unit configured to generate a 1/K-reduced image by reducing a size of the input image by 1/K, where K is a real number larger than 1;
a high-pass filter unit configured to extract a high-frequency component of the 1/K-reduced image, as a 1/K-reduced high-frequency image;
a patch extraction unit configured to extract an estimated patch of a predetermined size from the 1/K-reduced high-frequency image, the estimated patch being a region of the 1/K-reduced high-frequency image; and
an addition unit configured to add the estimated patch to a processing target block of the predetermined size in the 1/K-reduced image, to generate the output image.

12. The super-resolution processor according to claim 11, wherein the patch extraction unit is configured to extract the estimated patch, from a neighboring region of a position of the processing target block in the 1/K-reduced high-frequency image.

13. The super-resolution processor according to claim 11, further comprising:
a first feature value extraction unit configured to extract an input feature value, the input feature value being a feature value of the processing target block in the input image; and
a second feature value extraction unit configured to extract a plurality of first neighboring feature values, each of the plurality of first neighboring feature values being a feature value of a different one of a plurality of patches in the 1/K-reduced image, the plurality of patches each having the predetermined size,
wherein the patch extraction unit is configured to calculate a similarity between the input feature value and each of the plurality of first neighboring feature values, and extract, as the estimated patch, a region in the 1/K-reduced high-frequency image corresponding to any of: one first neighboring feature value having a highest similarity; a predetermined number of first neighboring feature values in a decreasing order of similarity; and first neighboring feature values each having a similarity equal to or higher than a predetermined threshold, from among the plurality of first neighboring feature values.

14. The super-resolution processor according to claim 11, further comprising:
a self-similarity ratio estimation unit configured to estimate a self-similarity ratio of the input image,
wherein the 1/K reduction unit is configured to generate the 1/K-reduced image by reducing the input image by 1/K, when the self-similarity ratio is 1/K.

15. The super-resolution processor according to claim 1, further comprising:

an edge super-resolution unit configured to generate an edge high-resolution image by increasing a resolution of the input image;

an edge detection unit configured to detect an edge in the input image; and an image combining unit configured to combine the output image and the edge high-resolution image, wherein the image combining unit is configured to:

combine the output image and the edge high-resolution image at a ratio in which the edge high-resolution image is higher than the output image, for a region having a larger amount of edge than a predetermined threshold in the input image; and combine the output image and the edge high-resolution image at a ratio in which the edge high-resolution image is lower than the output image, for a region having a smaller amount of edge than the predetermined threshold in the input image.

16. A super-resolution processing method for performing super-resolution processing on an input image to generate an output image of a higher resolution than the input image, the super-resolution processing method comprising:

generating an N-enlarged image by enlarging a size of the input image by a factor N, where N is a real number larger than 1;

generating an M-enlarged image by enlarging a size of the input image by a factor M, where M is a real number larger than 1;

extracting a high-frequency component of the M-enlarged image, as an M-enlarged high-frequency image;

extracting an estimated patch of a predetermined size from the M-enlarged high-frequency image, the estimated patch being a region of the M-enlarged high-frequency image; and adding the estimated patch to a processing target block of the predetermined size in the N-enlarged image, to generate the output image, wherein M is smaller than N.

17. A super-resolution processing method for performing super-resolution processing on an input image to generate an output image, the super-resolution processing method comprising:

generating a 1/K-reduced image by reducing a size of the input image by 1/K, where K is a real number larger than 1;

extracting a high-frequency component of the 1/K-reduced image, as a 1/K-reduced high-frequency image;

extracting an estimated patch of a predetermined size from the 1/K-reduced high-frequency image, the estimated patch being a region of the 1/K-reduced high-frequency image; and adding the estimated patch to a processing target block of the predetermined size in the 1/K-reduced image, to generate the output image.

18. A non-transitory computer-readable recording medium having a computer program recorded thereon for causing a computer to execute the super-resolution processing method according to claim 16.

19. A non-transitory computer-readable recording medium having a computer program recorded thereon for causing a computer to execute the super-resolution processing method according to claim 17.

* * * * *